United States Patent
Ohtake

Patent Number: 6,031,669
Date of Patent: Feb. 29, 2000

[54] ZOOM LENS

[75] Inventor: Motoyuki Ohtake, Ohmiya, Japan

[73] Assignee: Nikon Corporation, Tokyo, Japan

[21] Appl. No.: 08/977,926

[22] Filed: Nov. 24, 1997

Related U.S. Application Data

[63] Continuation of application No. 08/548,390, Oct. 26, 1995, abandoned.

[30] Foreign Application Priority Data

Oct. 26, 1994 [JP] Japan ..................................... 6-286018

[51] Int. Cl.⁷ .............................. G02B 15/14; G02B 3/02; G02B 9/00
[52] U.S. Cl. ........................ 359/687; 359/683; 359/686; 359/713; 359/714; 359/715; 359/740
[58] Field of Search ..................... 359/686, 687, 359/683, 676, 713–715, 740

[56] References Cited

U.S. PATENT DOCUMENTS

| | | | |
|---|---|---|---|
| 4,063,800 | 12/1977 | Iizuka et al. ............................. | 359/690 |
| 4,673,258 | 6/1987 | Masumoto .............................. | 359/686 |
| 5,042,927 | 8/1991 | Ogawa et al. .......................... | 359/683 |
| 5,126,883 | 6/1992 | Sato et al. .............................. | 359/683 |
| 5,325,233 | 6/1994 | Nakatsuji et al. ..................... | 359/683 |
| 5,361,167 | 11/1994 | Aoki ....................................... | 359/686 |
| 5,440,430 | 8/1995 | Sato ........................................ | 359/683 |
| 5,666,229 | 9/1997 | Ohtake ................................... | 359/683 |

FOREIGN PATENT DOCUMENTS

| | | | |
|---|---|---|---|
| 60-57814 | 4/1985 | Japan . | |
| 5-150161 | 6/1993 | Japan . | |
| 6-265788 | 9/1994 | Japan .................................... | 359/686 |

*Primary Examiner*—Georgia Epps
*Assistant Examiner*—Evelyn A. Lester
*Attorney, Agent, or Firm*—Klarquist Sparkman Campbell Leigh & Whinston, LLP

[57] ABSTRACT

A high-performance zoom lens is disclosed having at least four axially movable lens groups for zooming from a wide-angle end to a telephoto end. The zoom lens constitutes a number of lens elements that is no more than twice the number of movable lens groups, thereby facilitating compactness. The movable lens groups include a first, or most objectwise, movable lens group having positive refractive power, and a rear, or most imagewise, movable lens group having negative refractive power. The zoom lens satisfies at least one of four conditions, including:

$$0.3 < (f_W - B_{fW})/(f_T - B_{fT}) < 0.54$$

wherein $f_W$ and $B_{fW}$ are the focal length and back focus, respectively, of the zoom lens at the wide-angle end, and $f_T$ and $B_{fT}$ are the focal length and back focus, respectively, of the zoom lens at the telephoto end.

27 Claims, 30 Drawing Sheets

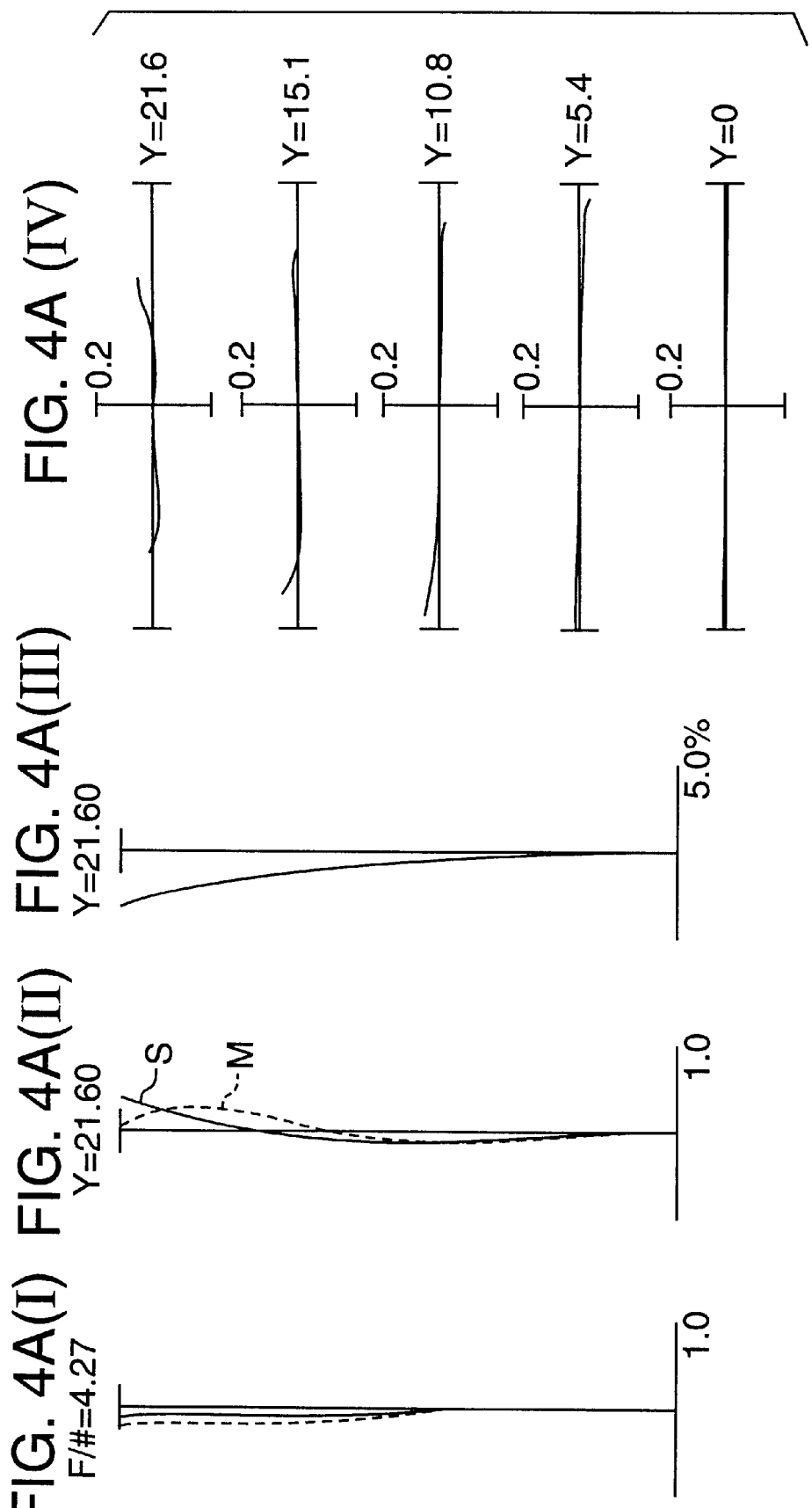

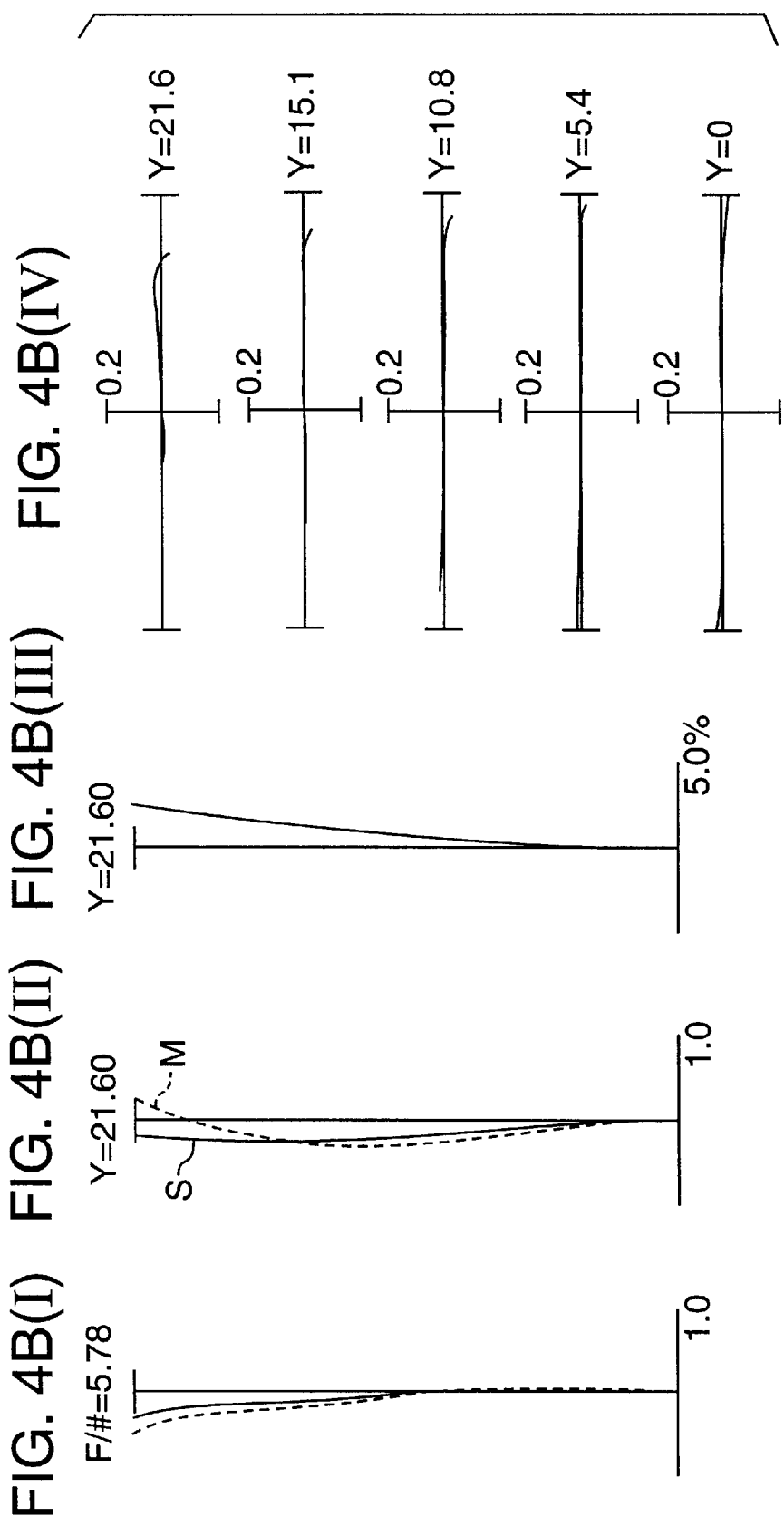

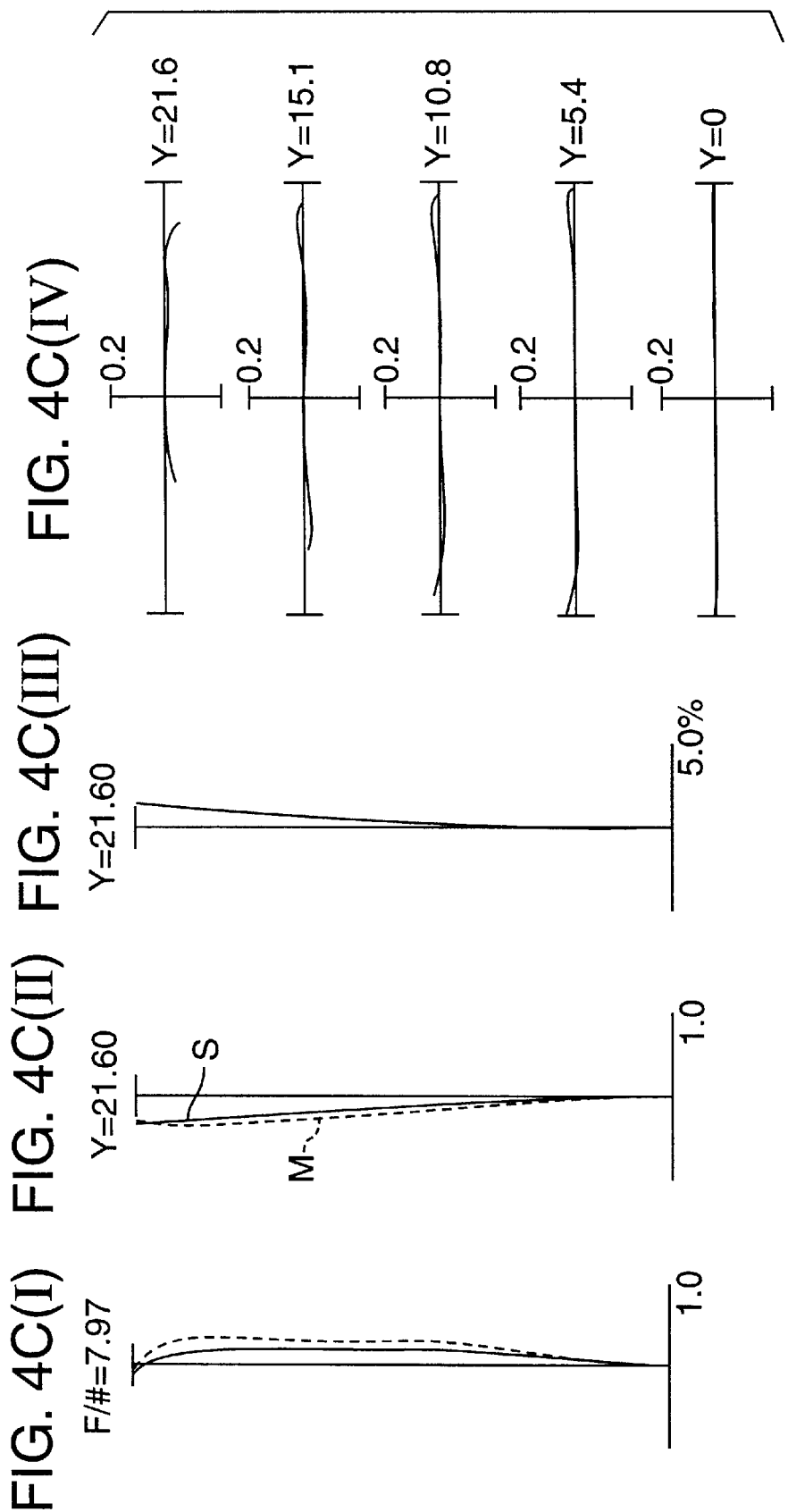

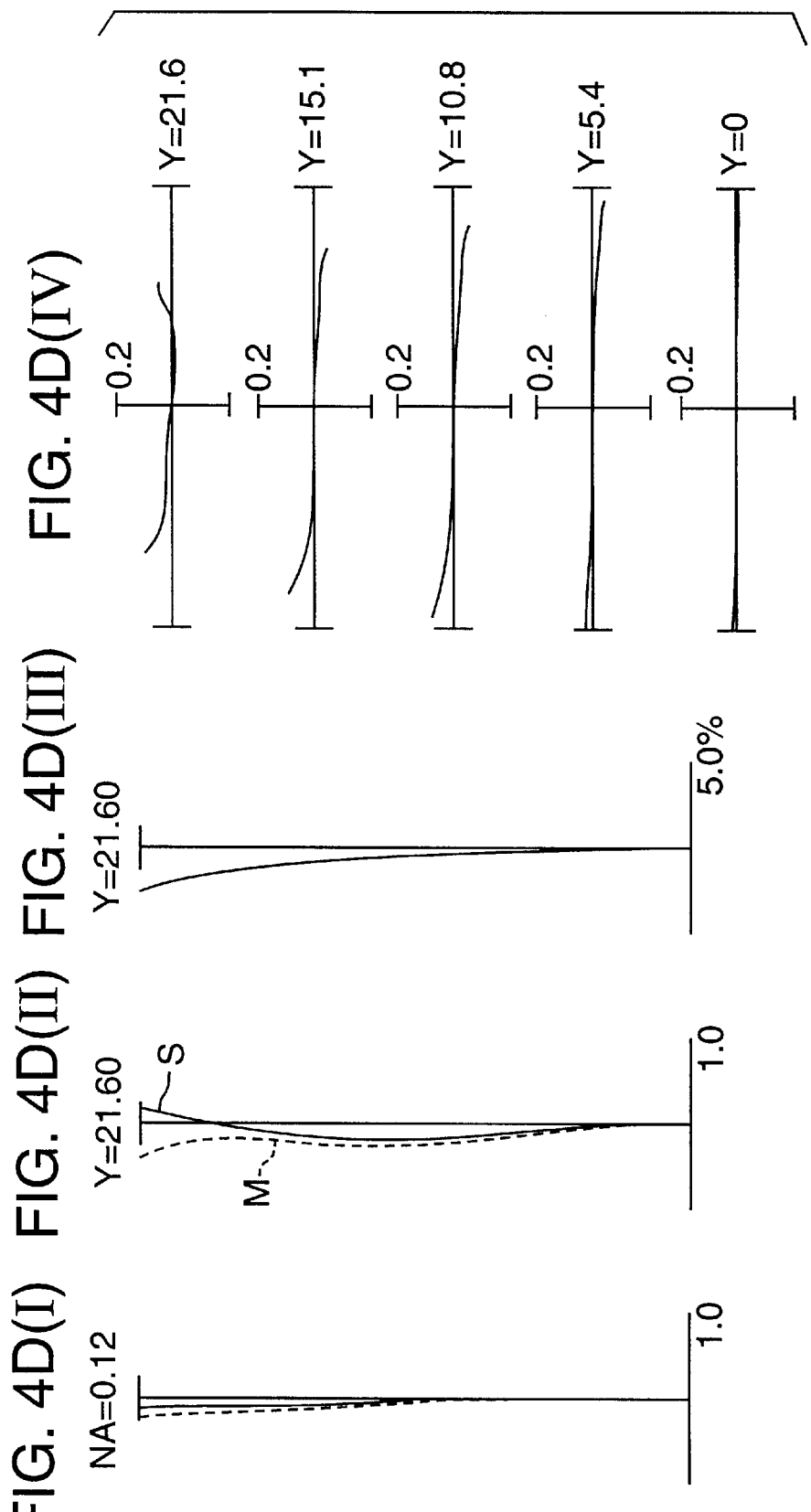

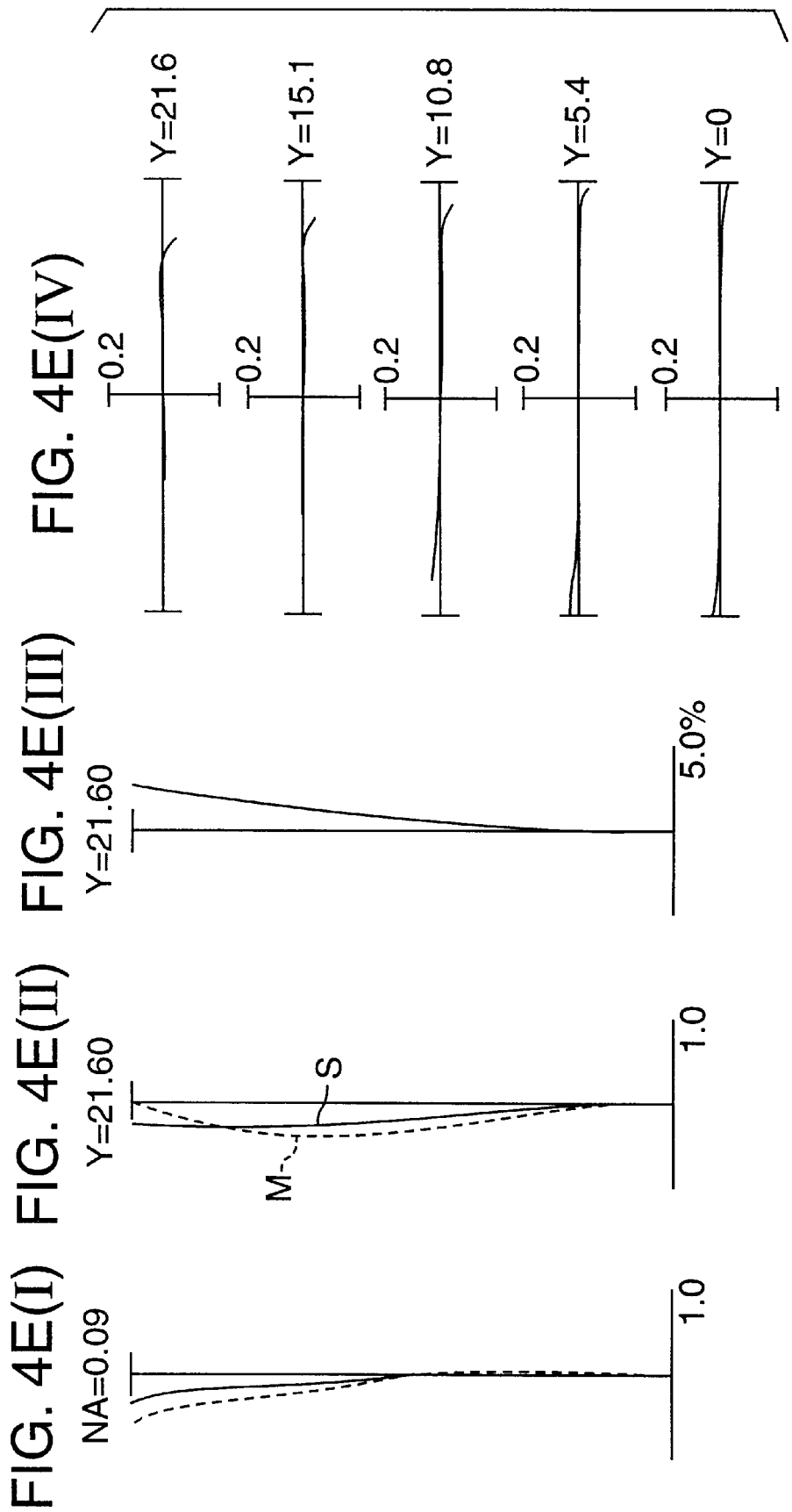

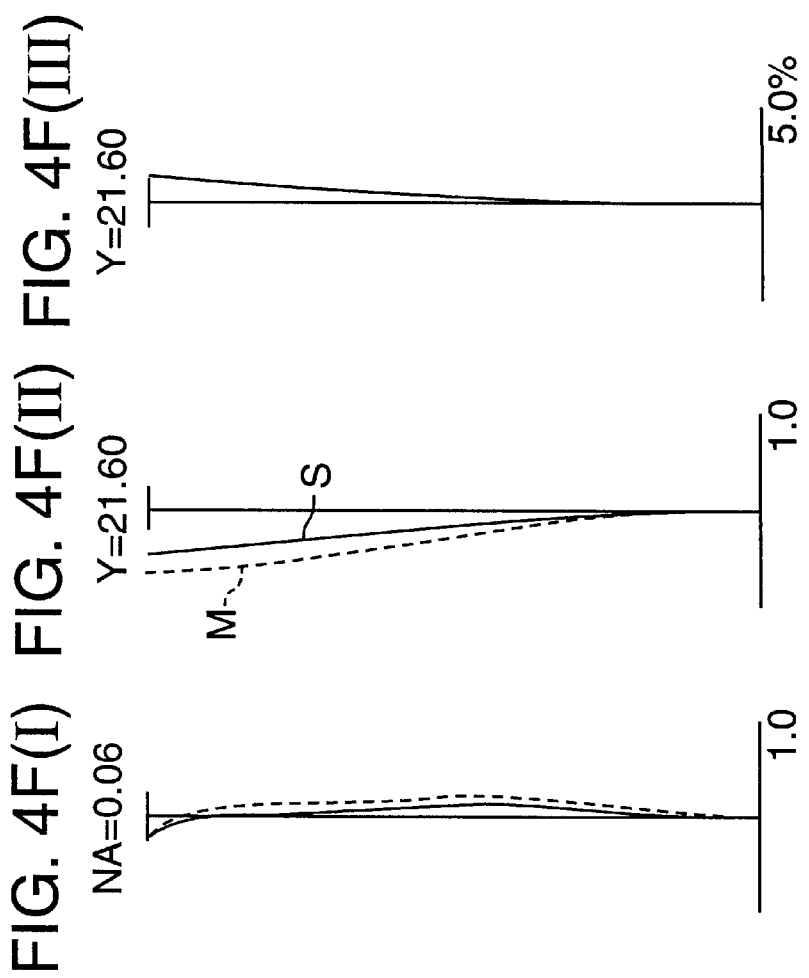

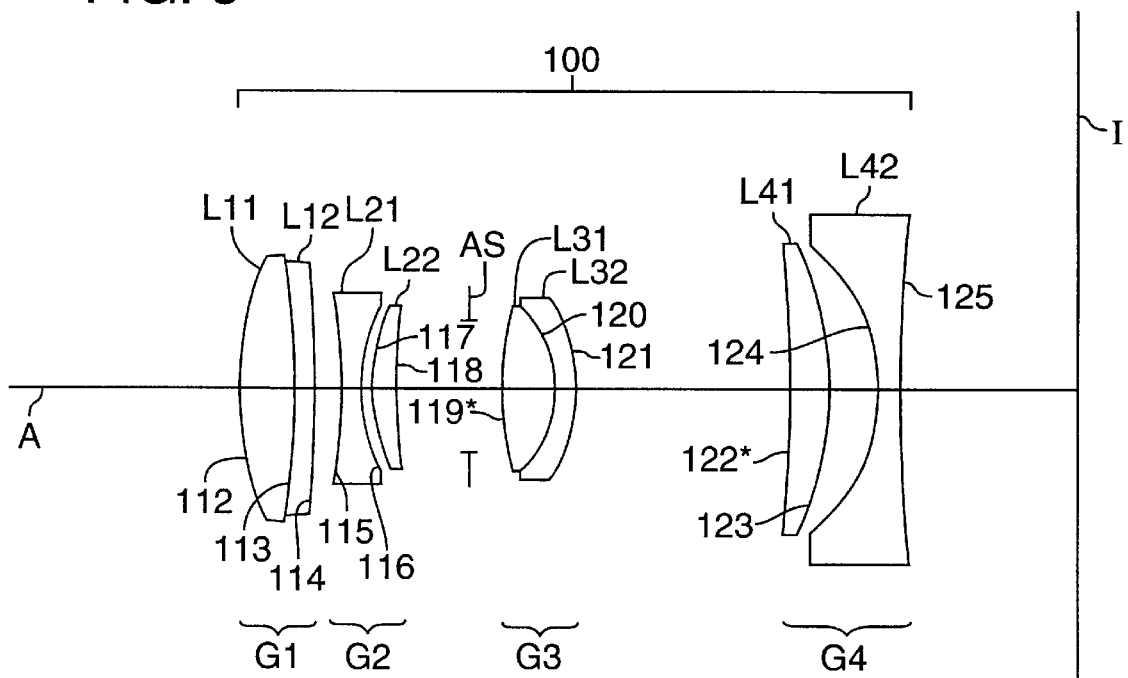

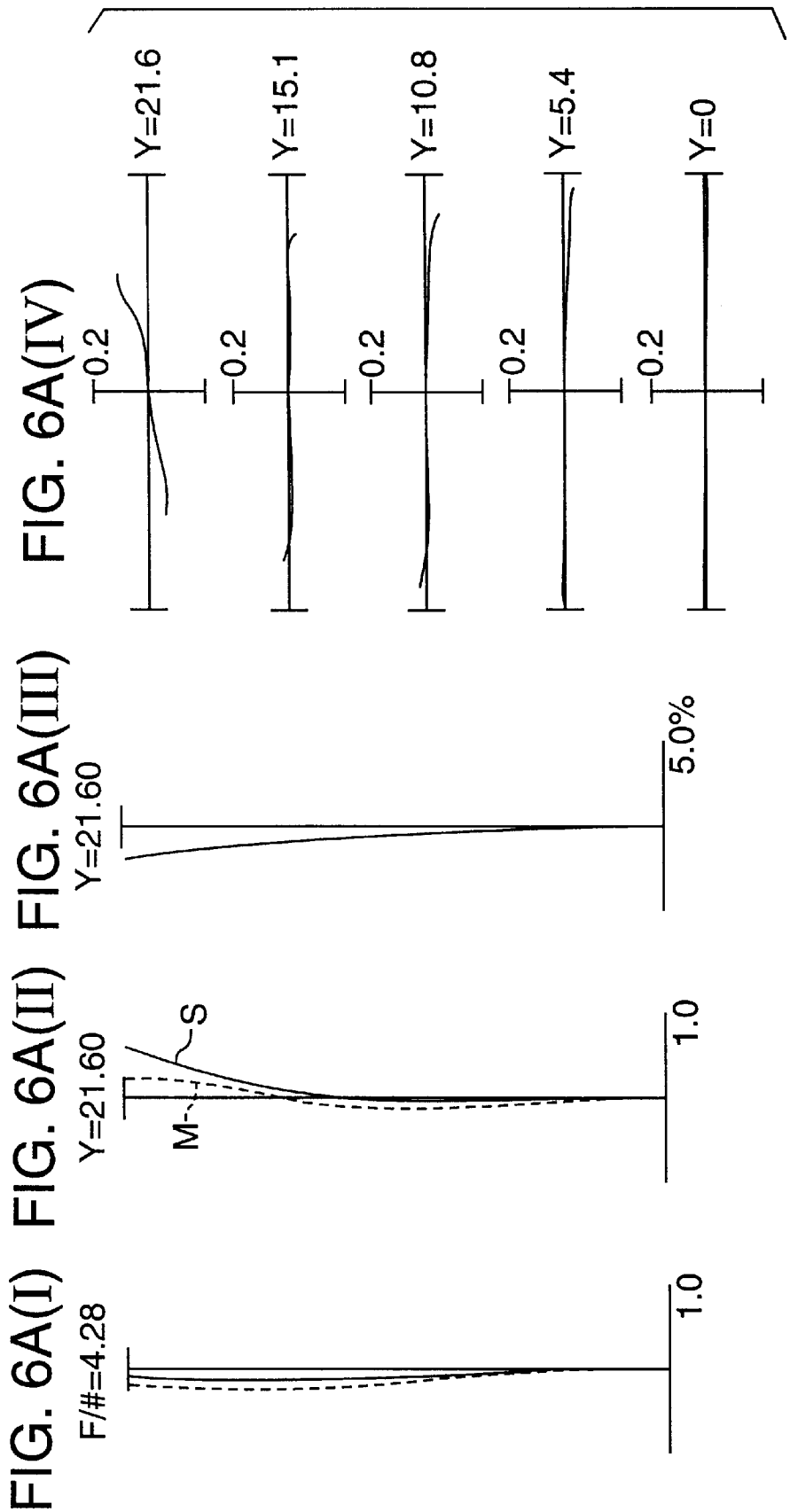

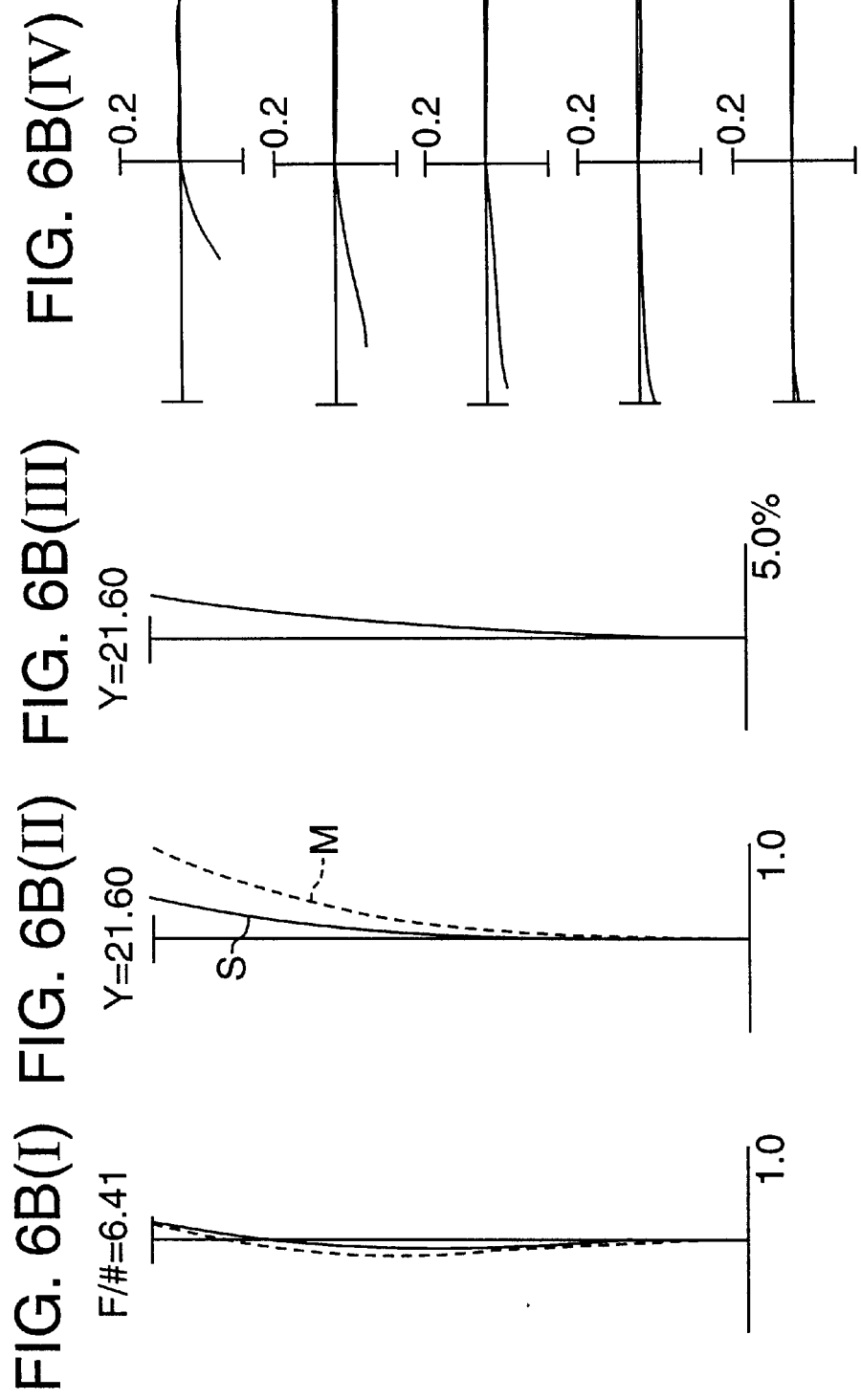

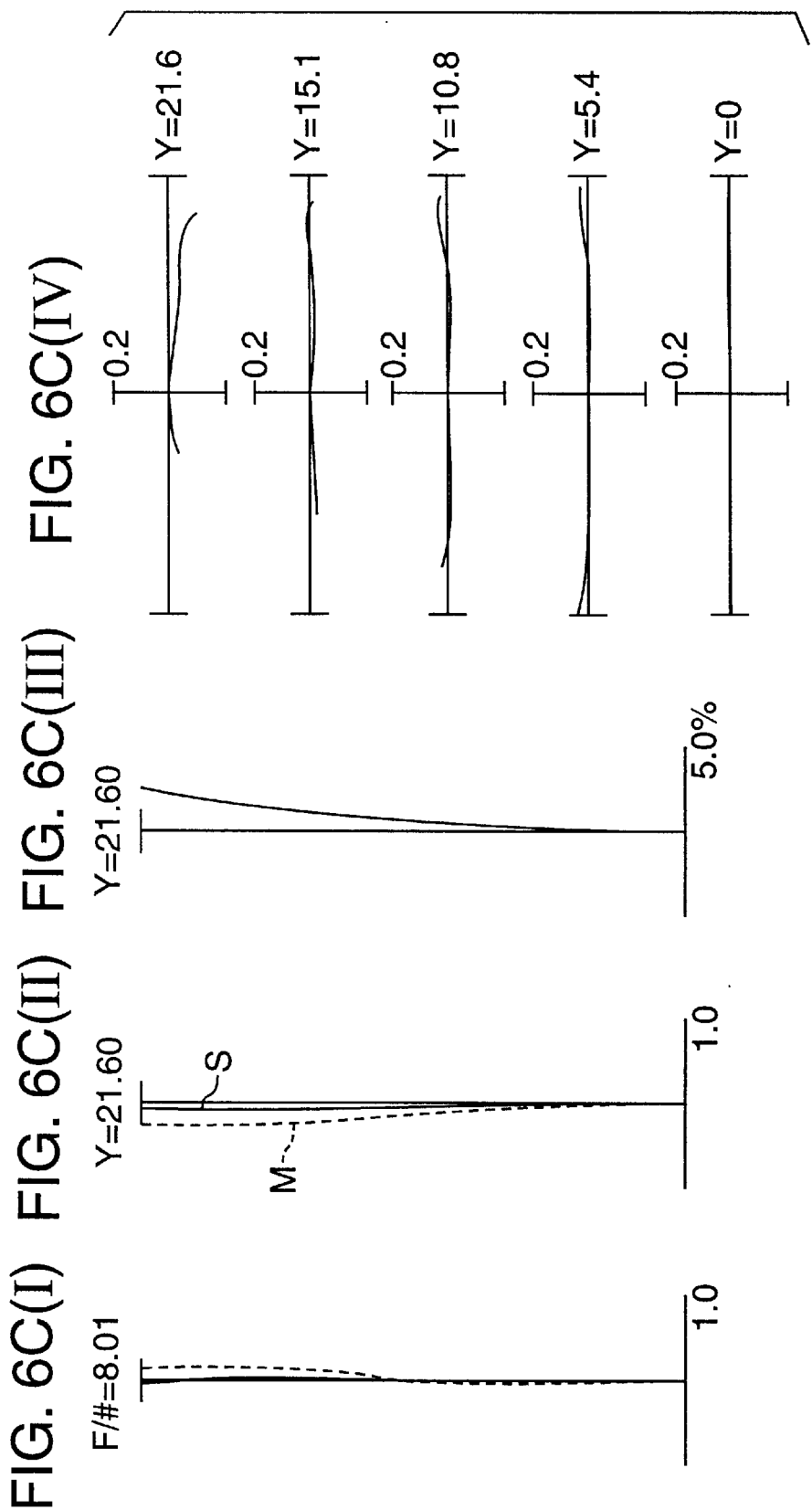

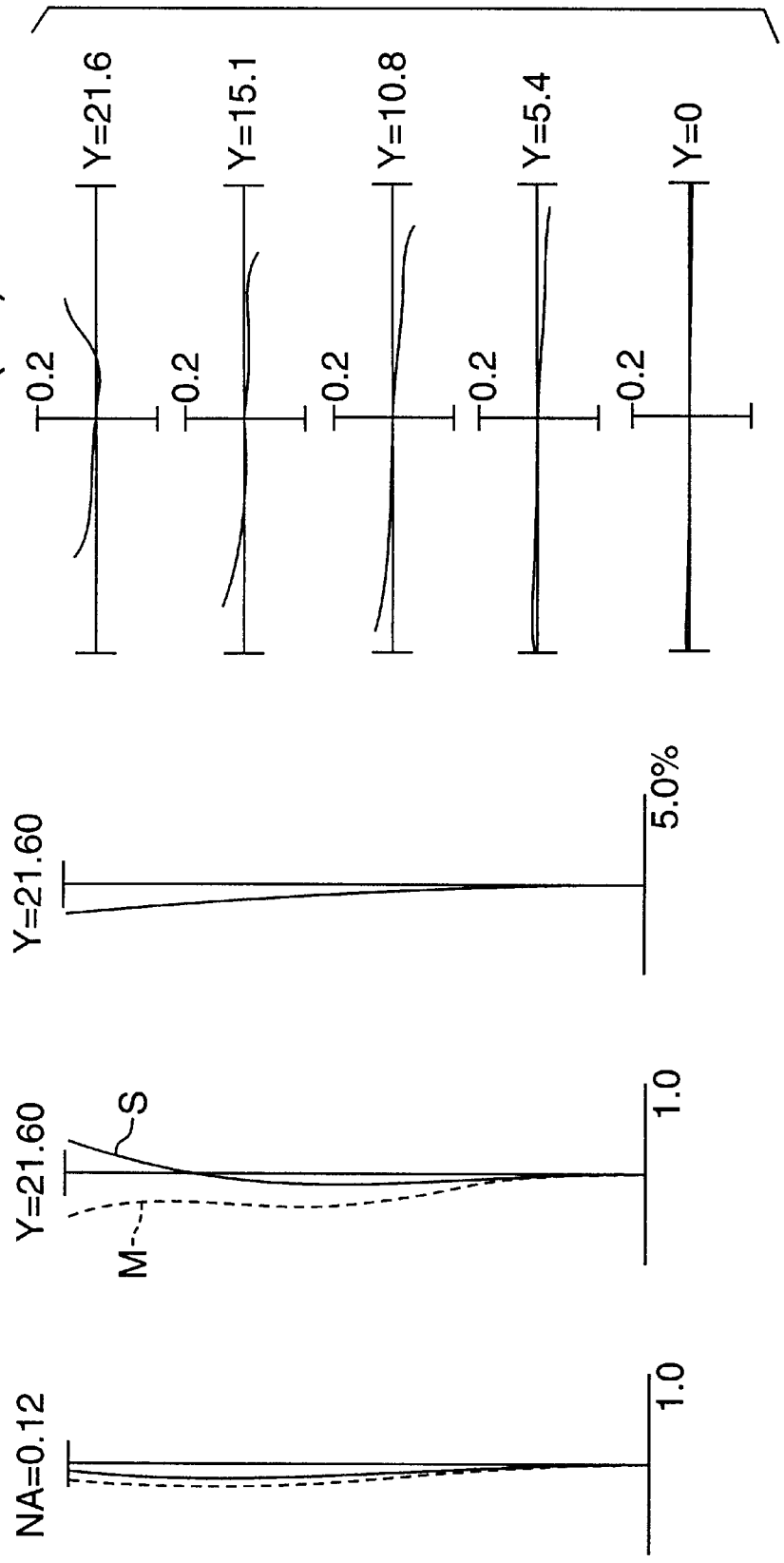

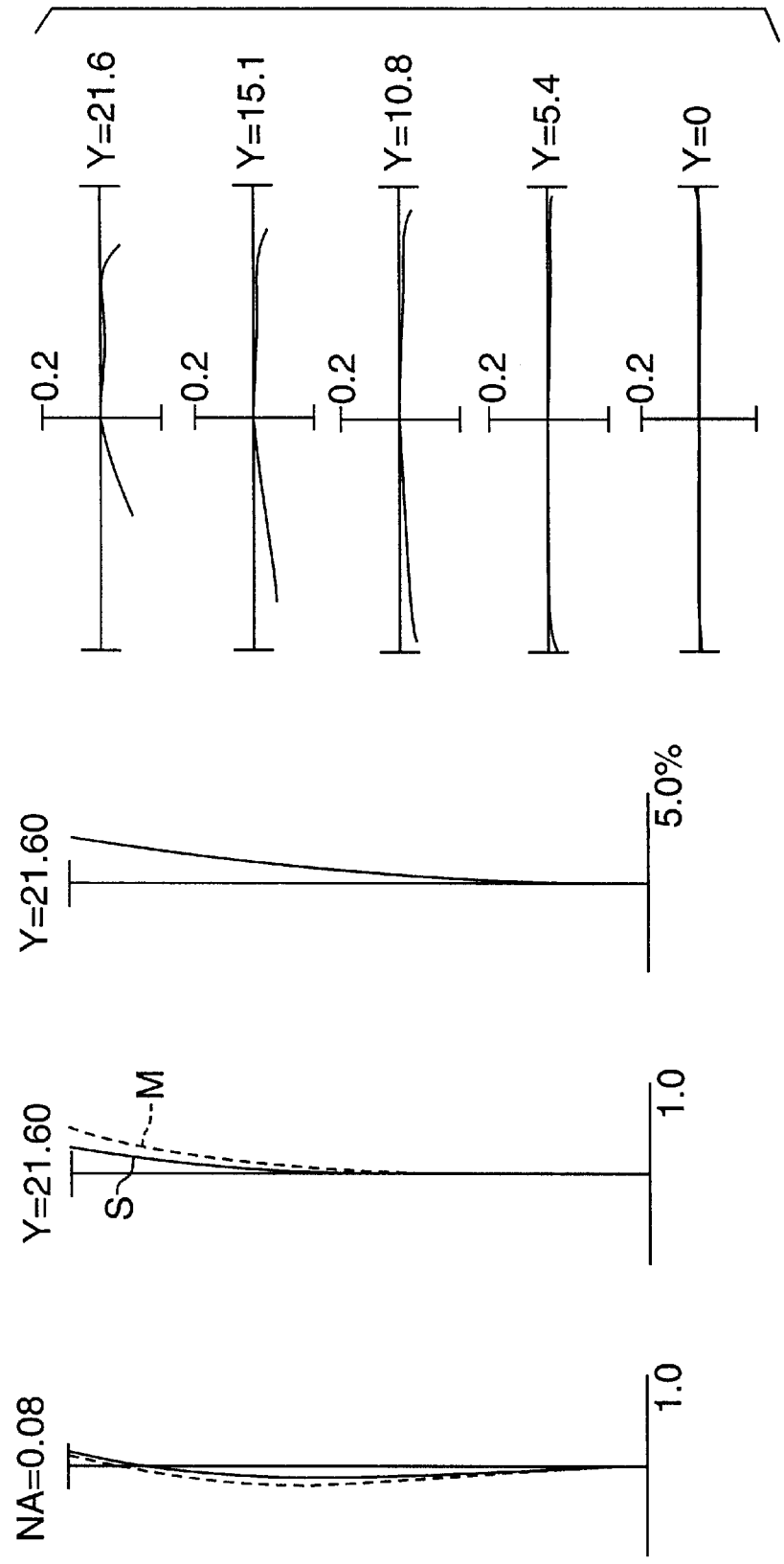

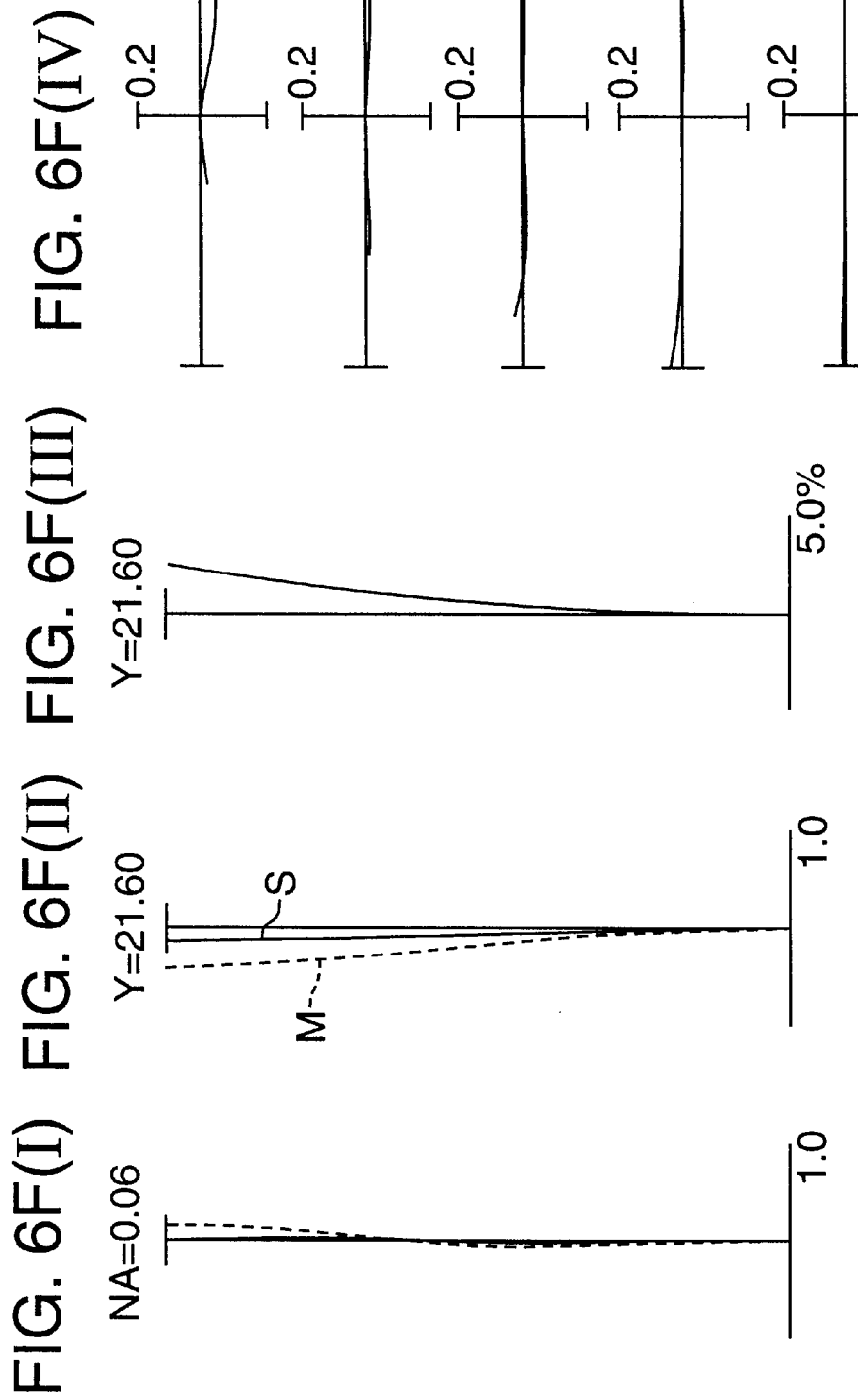

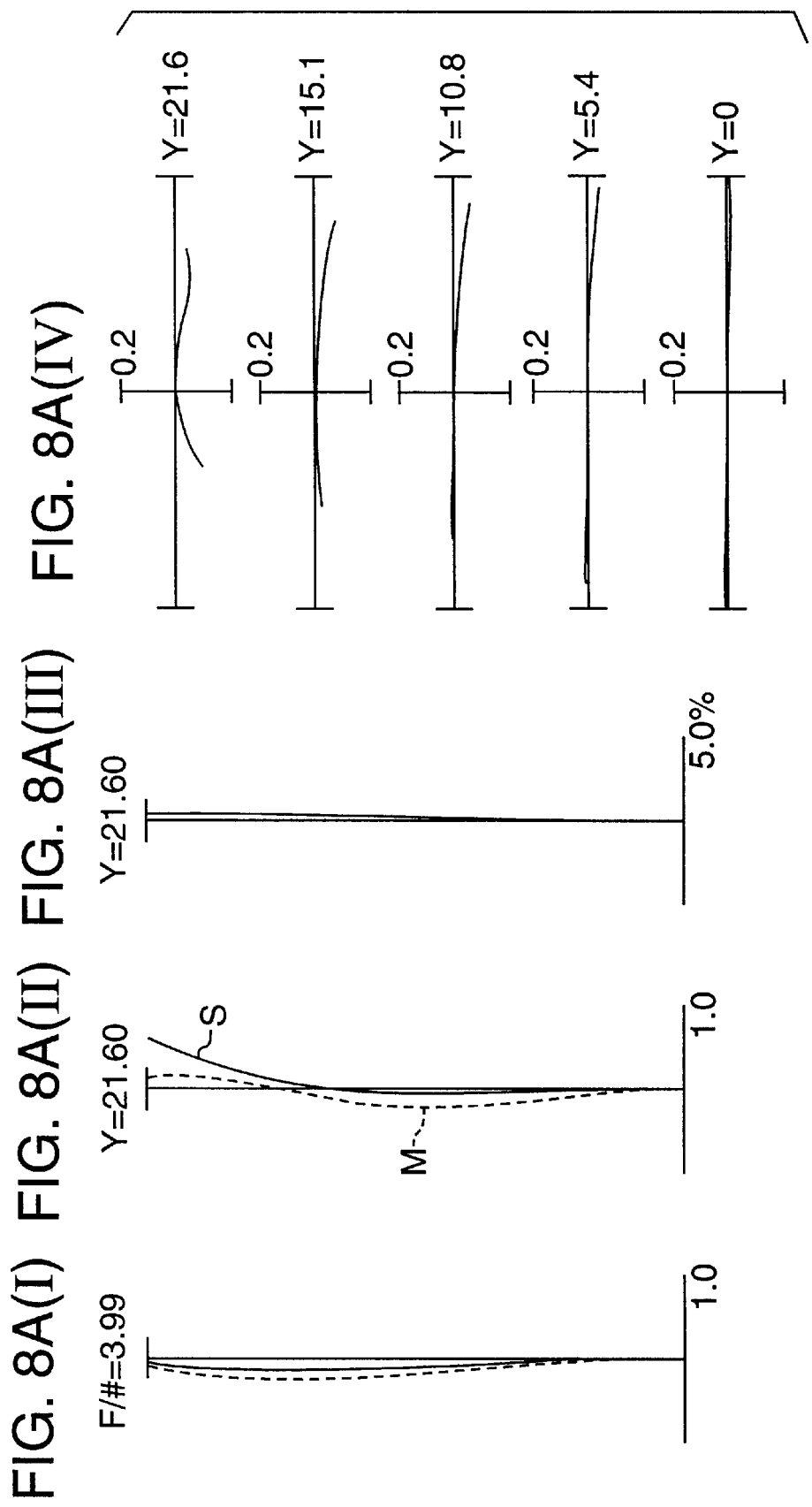

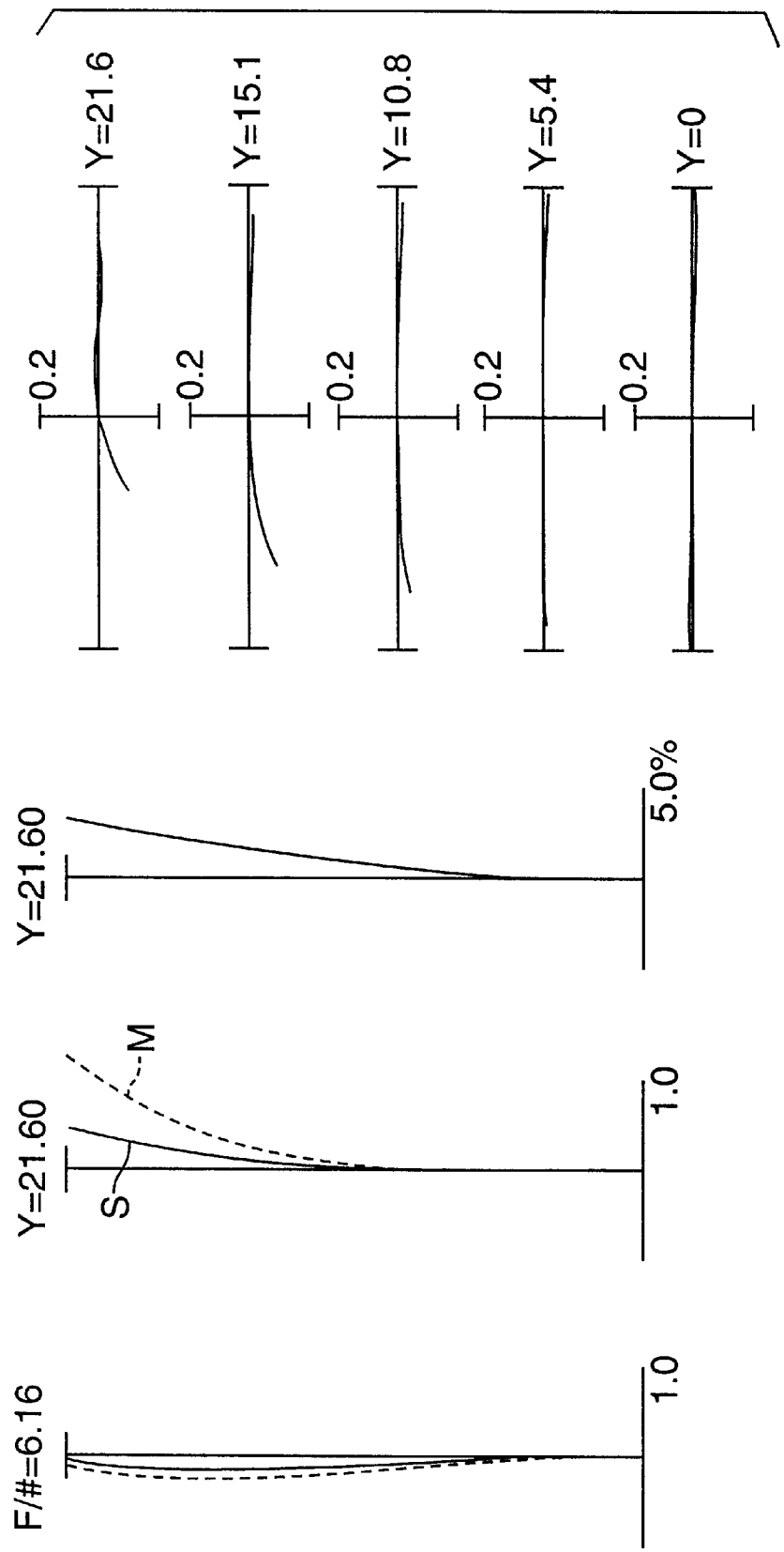

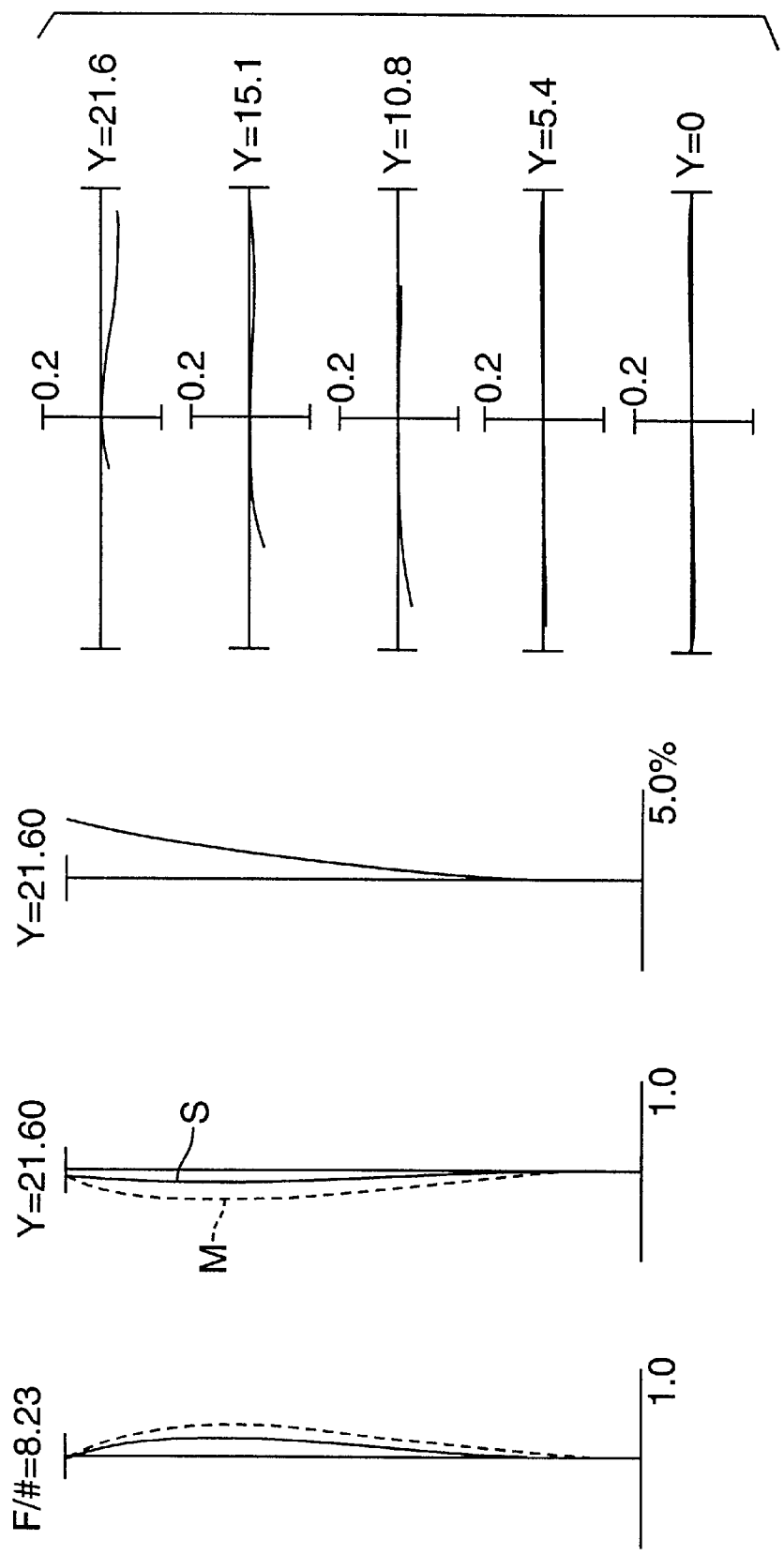

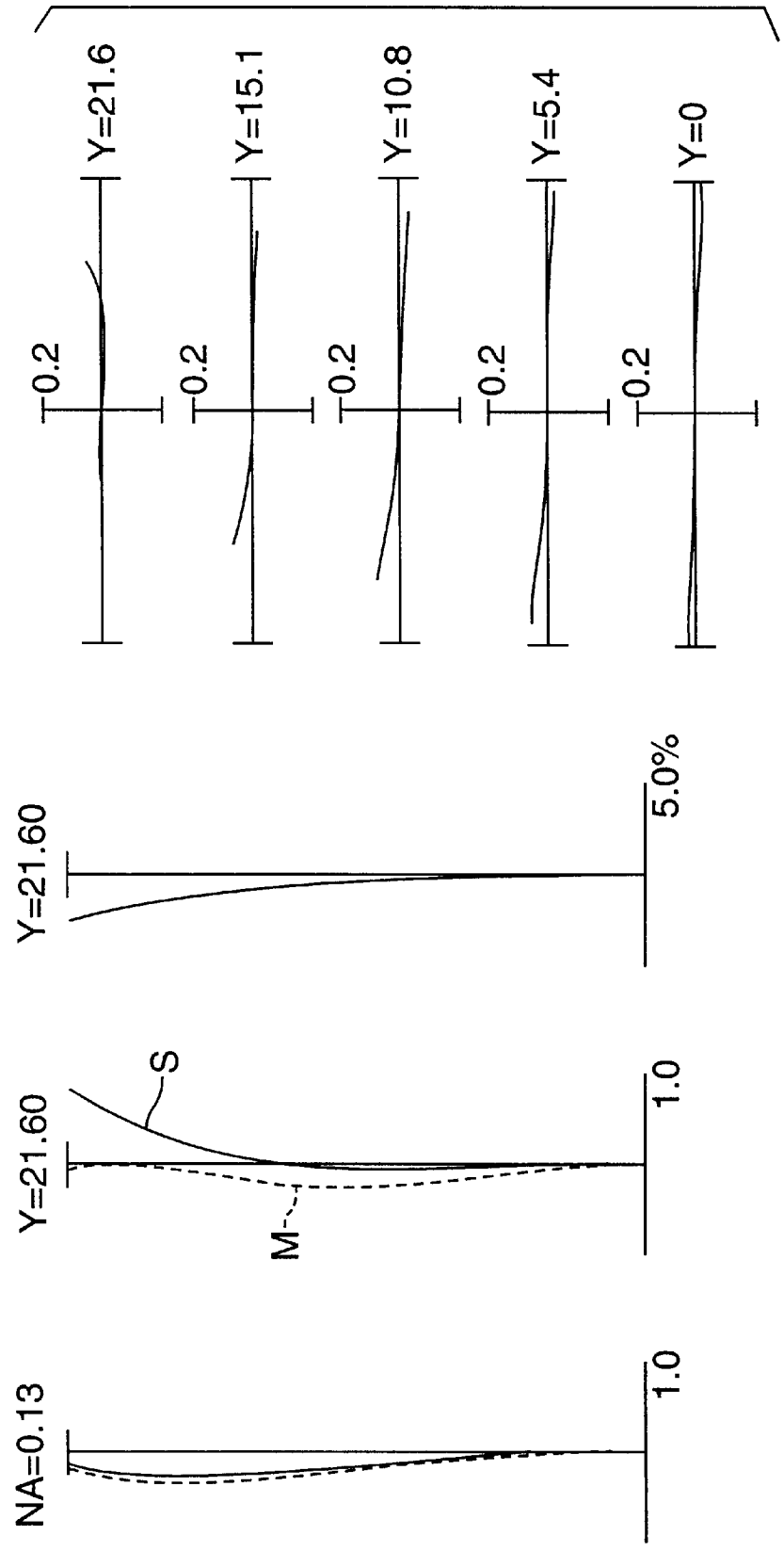

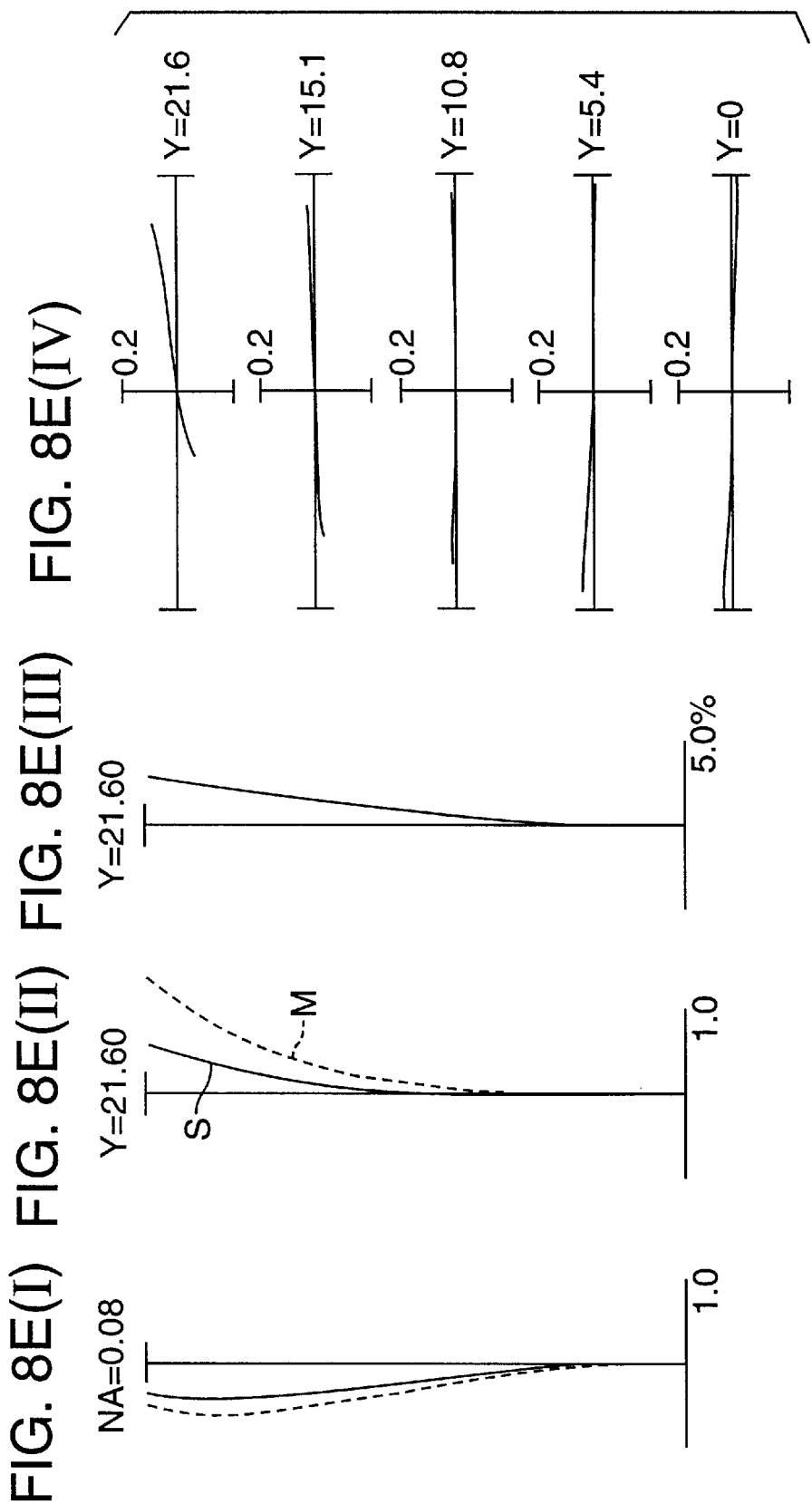

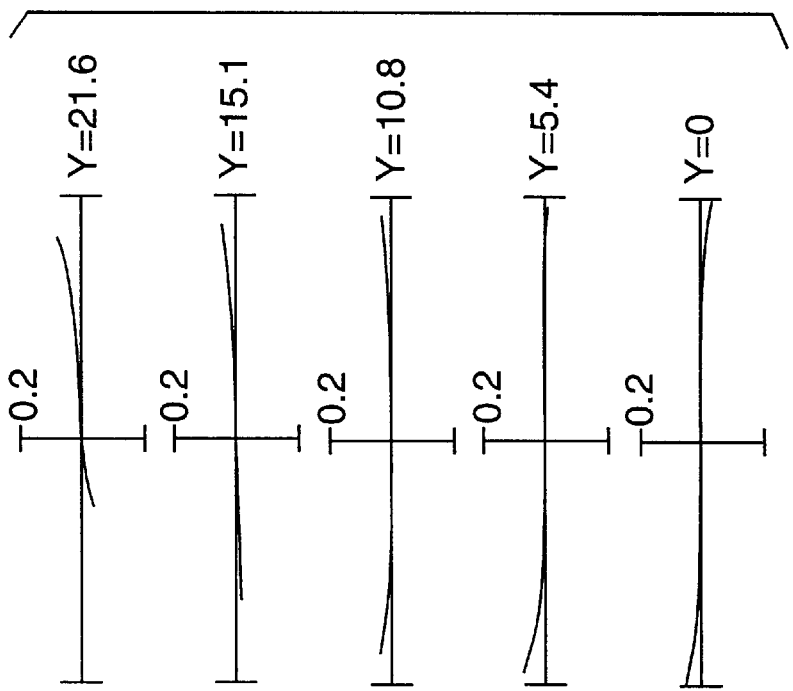

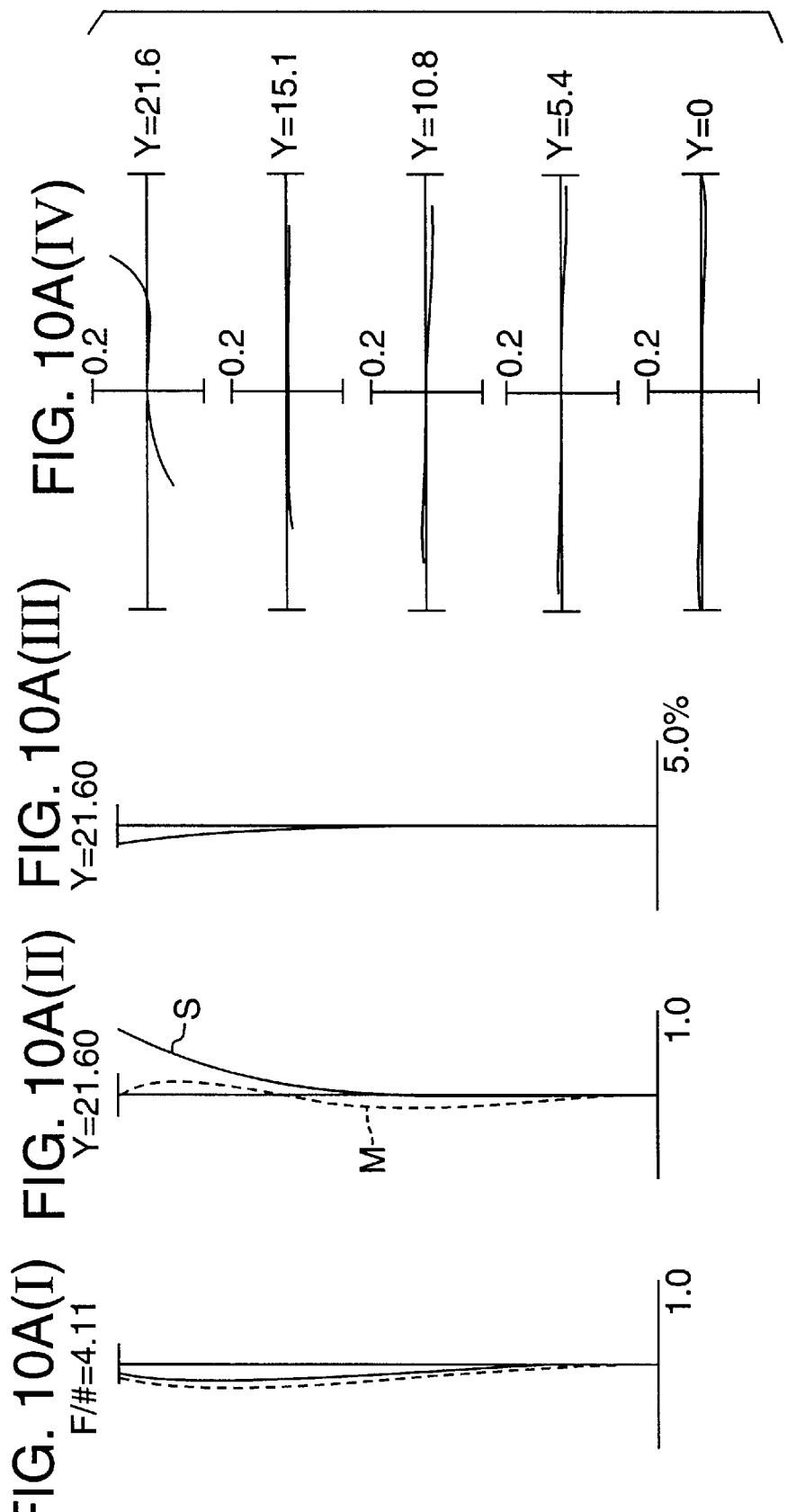

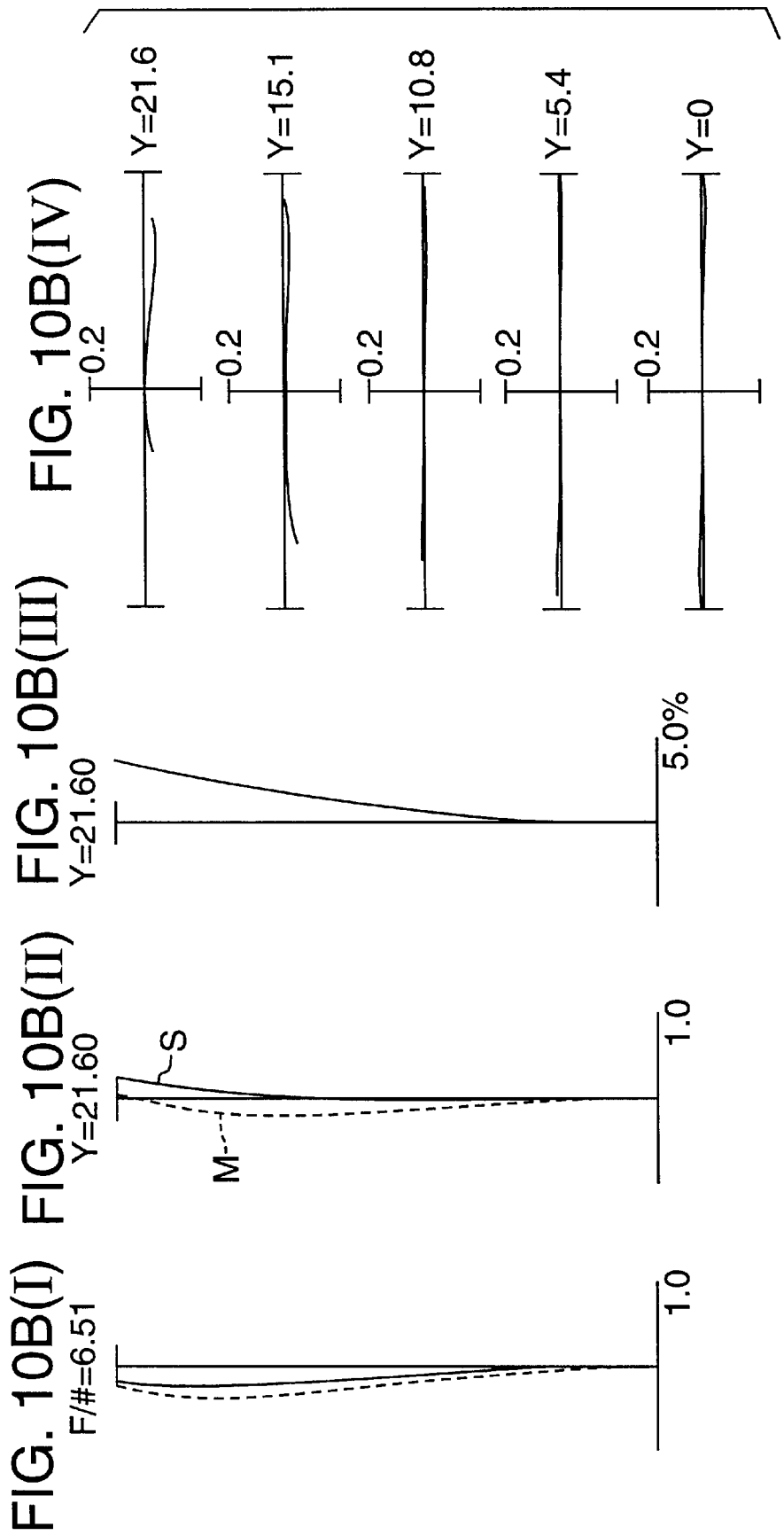

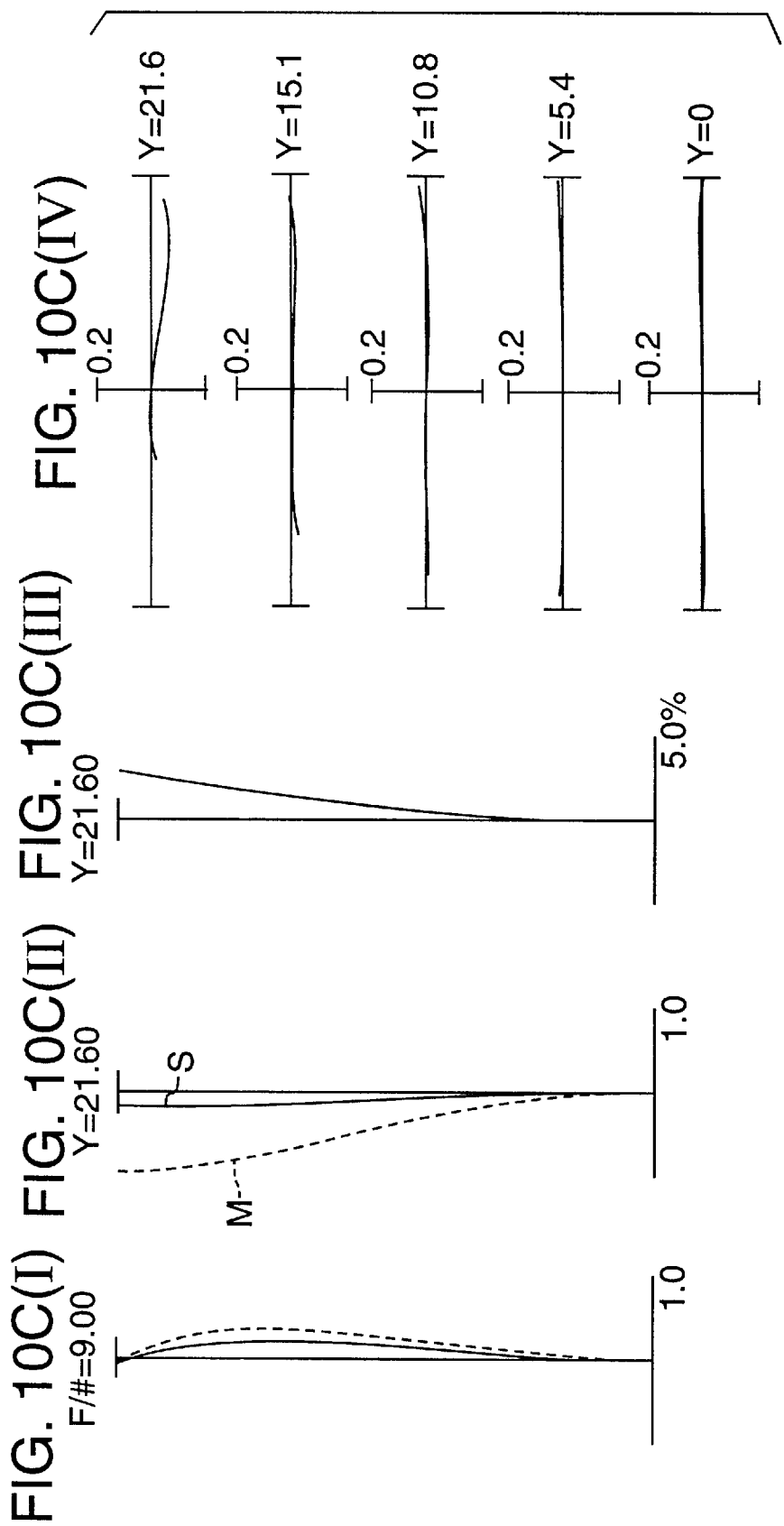

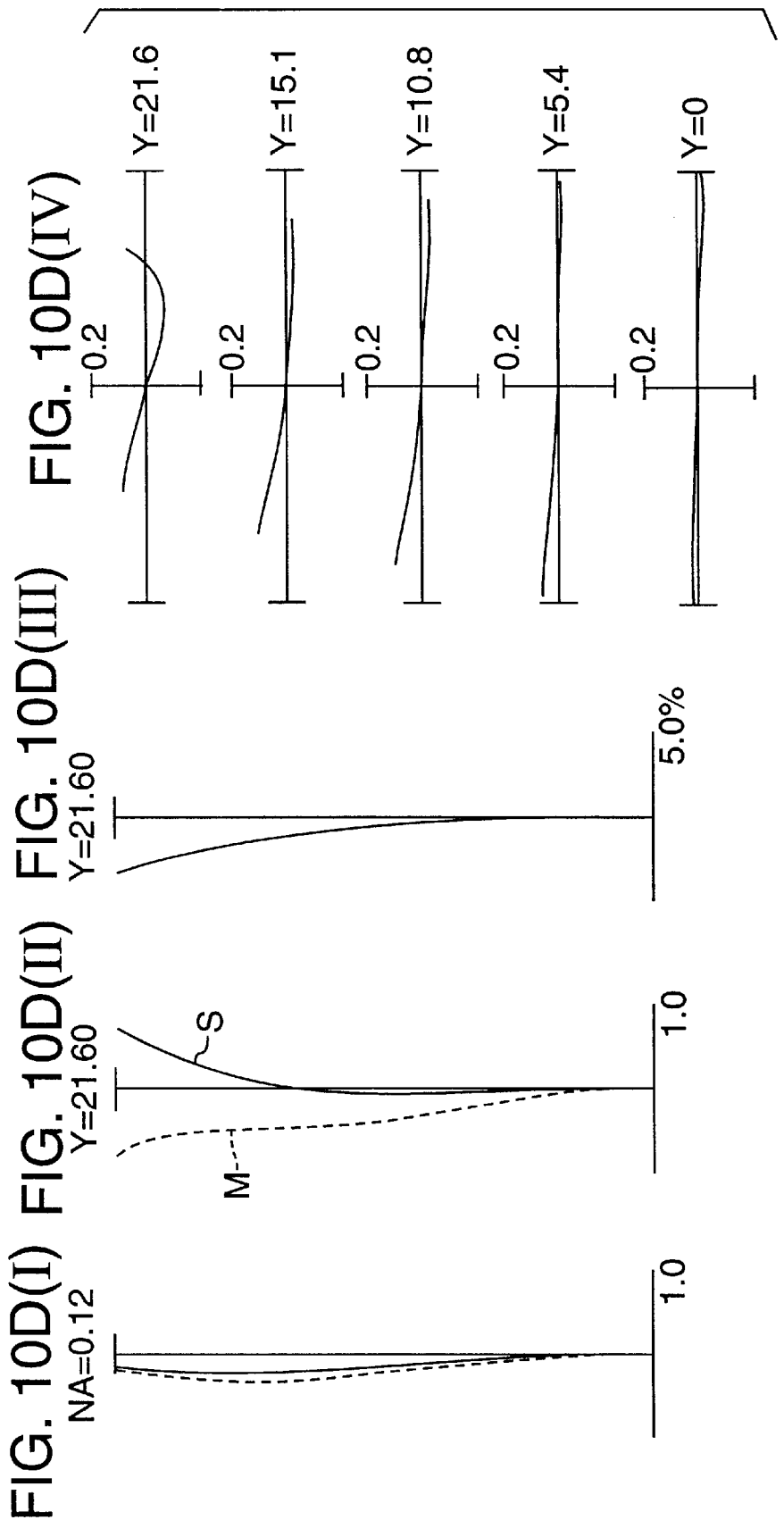

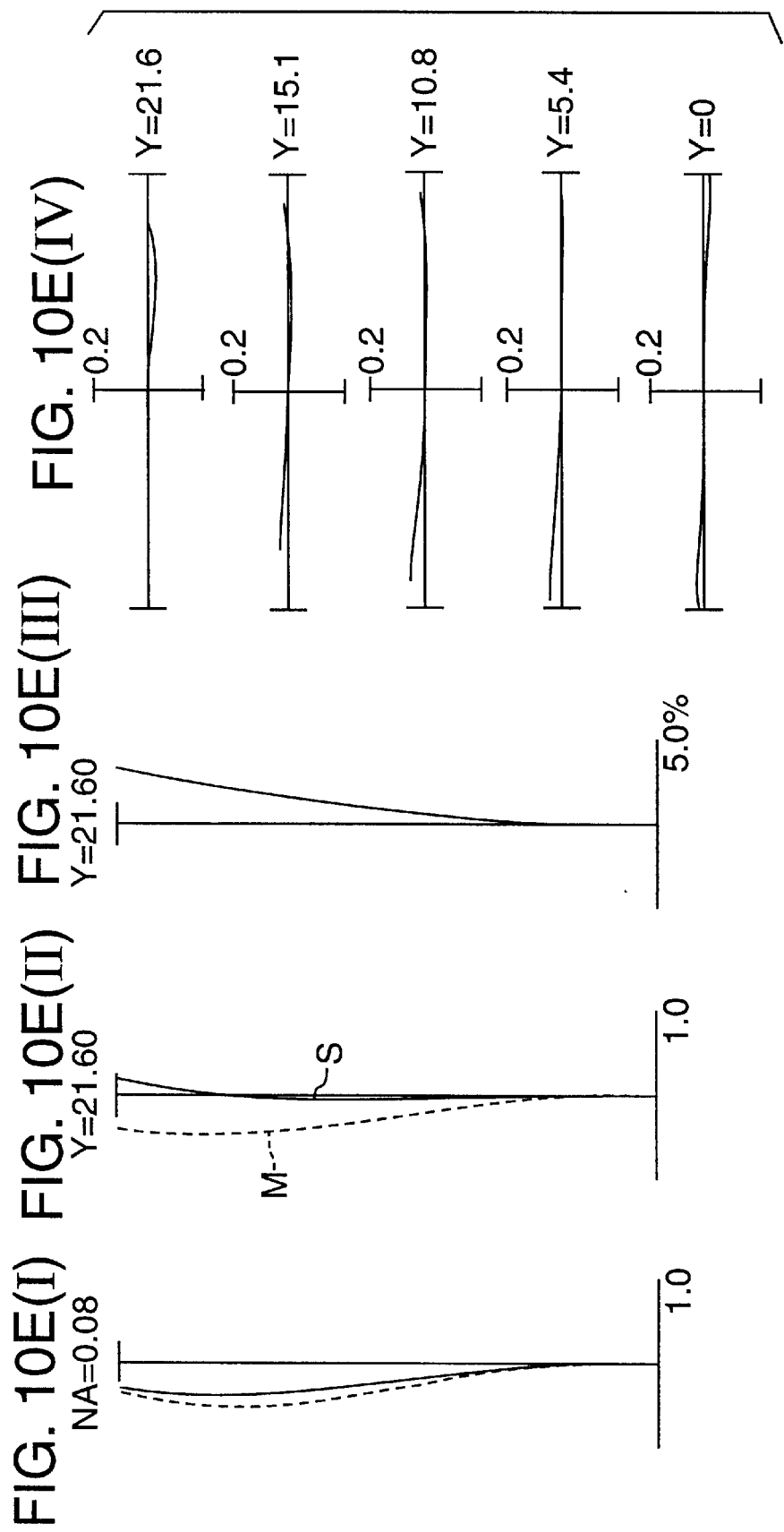

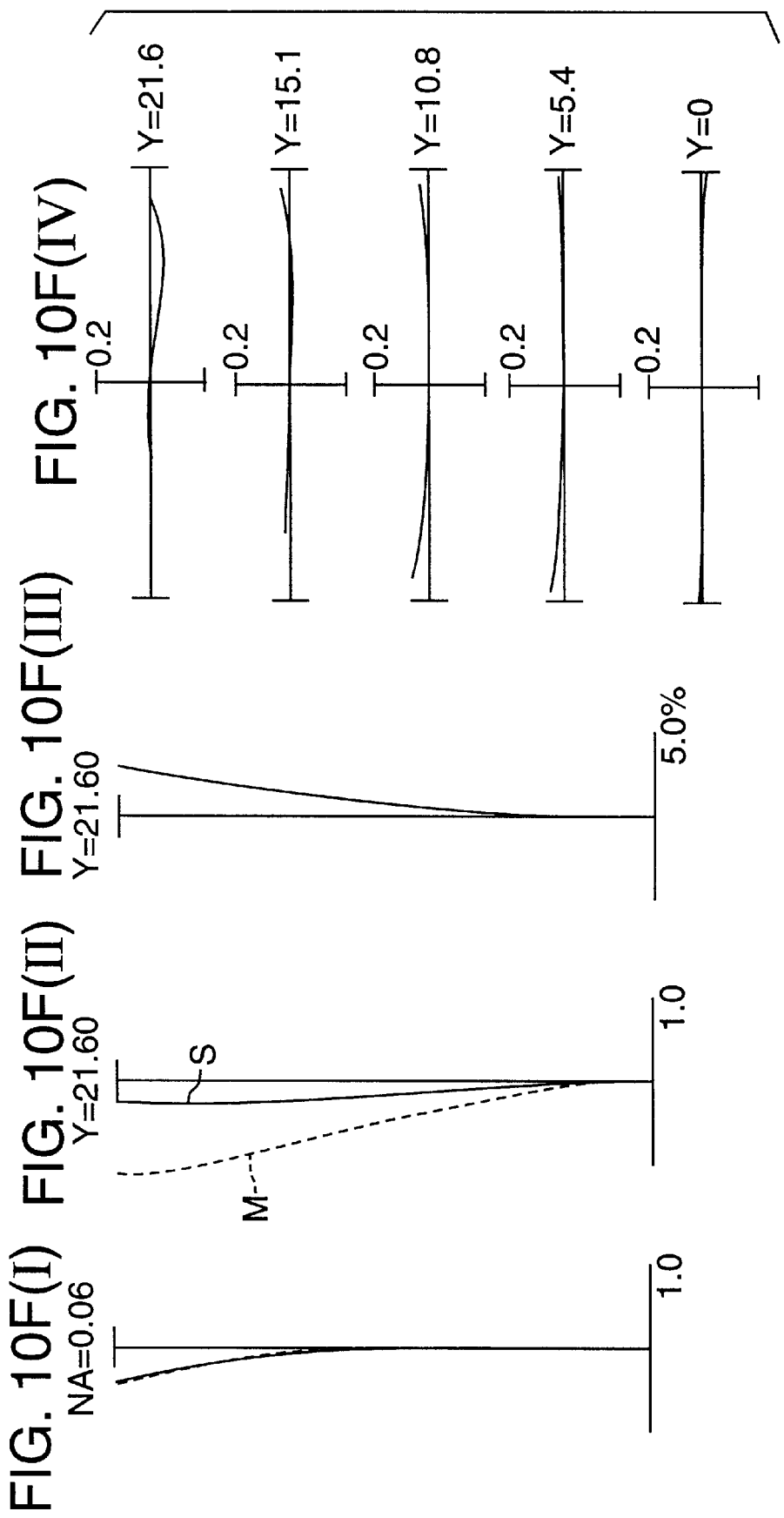

ized to minimize the zoom lens.
ZOOM LENS

This application is a continuation of application Ser. No. 08/548,390, filed Oct. 26, 1995, now abandoned.

FIELD OF THE INVENTION

This invention relates to zoom lenses.

BACKGROUND OF THE INVENTION

Recently, various zoom lenses having a high zoom ratio or high optical performance have been proposed. These zoom lenses include at least three movable lens groups (wherein these zoom lenses are called "multiple-movable-group zoom lenses"). Multiple-movable-group zoom lenses have been made possible by recent advances in lens barrel technology.

In recent years zoom lenses with compact size have been proposed to make a combination of zoom lens and camera body as small as possible. Specifically, zoom lenses such as a positive-positive-negative three-group zoom lens and a positive-negative-positive-negative four-group zoom lens have been proposed.

Generally, in multiple-movable-group zoom lenses, flexibility in selecting the zooming locus of each lens group is increased, so the flexibility to correct various aberrations is increased. Moreover, as the number of movable lens groups is increased, the change in the lateral magnification of each lens group is decreased in order to increase the zoom ratio and the performance of the zoom lens. With recent advances in lens-barrel technology, problems such as an increased complexity of the lens-barrel structure accompanying an increase in the number of axially movable lens groups have been overcome to a certain extent.

Until recently, in zoom lenses which are not restricted in back focus, a negative lens group was arranged as the rearmost (i.e., most imagewise) lens group and a positive lens group was arranged as the frontmost (i.e., most objectwise) lens group. The change in total length and back focus of the zoom lens were increased to minimize the zoom lens.

Each lens group in a conventional positive-positive-negative (from the object side to the image side) three-group zoom lens is axially movable objectwise such that, during zooming from the wide-angle end to the telephoto end of the zoom lens, the air space between the first and second lens groups axially expands and the air space between the second and third lens groups axially contracts. Such a lens is disclosed, for example, in Japan Laid-Open Patent Application No. Hei 2-256015.

Each lens group in a conventional positive-negative-positive-negative (from the object side to the image side) four-group zoom lens is axially movable objectwise such that, during zooming from the wide-angle end to the telephoto end, the air space between the first and second lens groups axially expands, the air space between the second and third lens groups axially contracts, and the air space between the third and fourth lens groups axially contracts. Such zoom lenses are disclosed, for example, in Japan Laid-Open Patent Application No. Sho 60-57814 and Japan Laid-Open Patent Application No. Hei 5-150161.

In a lens-shutter type of camera with a zoom lens, the lens system is retracted into the camera body as each variable air gap is minimized during zooming. Optional retraction of the lens requires corresponding reductions in the axial thickness of each lens group of the zoom lens.

In conventional three-group (positive-positive-negative) zoom lenses as disclosed in Japan Laid-Open Patent Application No. Hei 2-256015, the change in the lateral magnification of the third lens group during zooming is large. As a result, the variation of off-axis aberrations arising in the third lens group during zooming is increased for zoom lenses having a high zoom ratio (i.e., greater than 2.5). An additional disadvantage with such zoom lenses is that, because the second lens group typically comprises a negative lens group and a positive lens group, the number of constituent lens elements in such lenses is disadvantageously large.

In conventional four-group (positive-negative-positive-negative) zoom lenses as disclosed in Japan Laid-Open Patent Application No. Sho 60-57814, the combined refracting power of the first and second lens groups at or near the wide-angle end is close to zero. As a result, it is difficult to obtain a sufficient back focus with such lenses at the wide-angle end. Also, since off-axis rays through the fourth lens group tend to be away from the axis, the diameter of the fourth lens group would need to be too great.

A four-group zoom lens is favorable for achieving a high zoom ratio, but the change in the off-axis ray height at the second lens group during zooming is small, though the change in the incident angle of the off-axis ray to the second lens group is large. Consequently, when the zoom ratio is greater than three, the variation of the off-axis aberration arising in the second lens group increases during zooming and it is difficult to obtain high performance.

In the four-group (positive-negative-positive-negative) zoom lens disclosed in Japan Laid-Open Patent Application No. Hei 5-150161, the combined refractive power of the first and second lens groups at the wide-angle end is negative. However, the change in the total length of the zoom lens during zooming is small, so such a zoom lens is not suitable for achieving a high zoom ratio.

Therefore, an object of the present invention is to provide a zoom lens having a high zoom ratio while maintaining good performance, simple construction (including the smallest possible number of lens elements), and compactness.

SUMMARY OF THE INVENTION

The present invention satisfies the foregoing need by providing a high-performance, wide-angle, zoom lens comprising four or more lens groups that are movable along an optical axis during zooming.

According to one aspect of the present invention, the number of lens elements comprising the zoom lens is no more than two times the number of movable lens groups in the lens, thereby providing a zoom lens that is simple and compact. Among the movable lens groups, the "frontmost" or "first" (i.e., most objectwise) lens group has a positive refractive power, and the "rearmost" (i.e., most imagewise) lens group has a negative refractive power. Such a zoom lens satisfies the condition:

$$0.3 < (f_W - B_{fW})/(f_T - B_{fT}) < 0.54$$

wherein $f_W$ is the focal length of the zoom lens at the wide-angle end of the zooming range, $B_{fW}$ is the back focus of the zoom lens at the wide-angle end of the zooming range, $f_T$ is the focal length of the zoom lens at the telephoto end of the zooming range, and $B_{fT}$ is the back focus of the zoom lens at the telephoto end of the zooming range.

BRIEF DESCRIPTION OF THE DRAWINGS

FIGS. 4A(I)–4A(IV) are plots of spherical aberration, astigmatism, distortion, and coma, respectively, for Numerical Example 1, wide-angle end, focused at infinity.

FIGS. 4B(I)–4B(IV) are plots of spherical aberration, astigmatism, distortion, and coma, respectively, for Numerical Example 1, intermediate focal-length state, focused at infinity.

FIGS. 4C(I)–4C(IV) are plots of spherical aberration, astigmatism, distortion, and coma, respectively, for Numerical Example 1, telephoto end, focused at infinity.

FIGS. 4D(I)–4D(IV) are plots of spherical aberration, astigmatism, distortion, and coma, respectively, for Numerical Example 1, wide-angle end, zoom lens lateral magnification=−1/30.

FIGS. 4E(I)–4E(IV) are plots of spherical aberration, astigmatism, distortion, and coma, respectively, for Numerical Example 1, intermediate focal-length state, zoom lens lateral magnification=−1/30.

FIGS. 4F(I)–4F(IV) are plots of spherical aberration, astigmatism, distortion, and coma, respectively, for Numerical Example 1, telephoto end, zoom lens lateral magnification =−1/30.

FIG. 5 is an optical diagram of the embodiment or Numerical Example 2 in the wide-angle end.

FIGS. 6A(I)–6A(IV) are plots of spherical aberration, astigmatism, distortion, and coma, respectively, for Numerical Example 2, wide-angle end, focused at infinity.

FIGS. 6B(I)–6B(IV) are plots of spherical aberration, astigmatism, distortion, and coma, respectively, for Numerical Example 2, intermediate focal-length state, focused at infinity.

FIGS. 6C(I)–6C(IV) are plots of spherical aberration, astigmatism, distortion, and coma, respectively, for Numerical Example 2, telephoto end, focused at infinity.

FIGS. 6D(I)–6D(IV) are plots of spherical aberration, astigmatism, distortion, and coma, respectively, for Numerical Example 2, wide-angle end, zoom lens lateral magnification=−1/30.

FIGS. 6E(I)–6E(IV) are plots of spherical aberration, astigmatism, distortion, and coma, respectively, for Numerical Example 2, intermediate focal-length state, zoom lens lateral magnification=−1/30.

FIGS. 6F(I)–6F(IV) are plots of spherical aberration, astigmatism, distortion, and coma, respectively, for Numerical Example 2, telephoto end, zoom lens lateral magnification=−1/30.

FIGS. 8A(I)–8A(IV) are plots of spherical aberration, astigmatism, distortion, and coma, respectively, for Numerical Example 3, wide-angle end, focused at infinity.

FIGS. 8B(I)–8B(IV) are plots of spherical aberration, astigmatism, distortion, and coma, respectively, for Numerical Example 3, intermediate focal-length state, focused at infinity.

FIGS. 8C(I)–8C(IV) are plots of spherical aberration, astigmatism, distortion, and coma, respectively, for Numerical Example 3, telephoto end, focused at infinity.

FIGS. 8D(I)–8D(IV) are plots of spherical aberration, astigmatism, distortion, and coma, respectively, for Numerical Example 3, wide-angle end, zoom lens lateral magnification=−1/30.

FIGS. 8E(I)–8E(IV) are plots of spherical aberration, astigmatism, distortion, and coma, respectively, for Numerical Example 3, intermediate focal-length state, zoom lens lateral magnification=−1/30.

FIGS. 8F(I)–8F(IV) are plots of spherical aberration, astigmatism, distortion, and coma, respectively, for Numerical Example 3, telephoto end, zoom lens lateral magnification=−1/30.

FIGS. 10A(I)–10A(IV) are plots of spherical aberration, astigmatism, distortion, and coma, respectively, for Numerical Example 4, wide-angle end, focused at infinity.

FIGS. 10B(I)–10B(IV) are plots of spherical aberration, astigmatism, distortion, and coma, respectively, for Numerical Example 4, intermediate focal-length state, focused at infinity.

FIGS. 10C(I)–10C(IV) are plots of spherical aberration, astigmatism, distortion, and coma, respectively, for Numerical Example 4, telephoto end, focused at infinity.

FIGS. 10D(I)–10D(IV) are plots of spherical aberration, astigmatism, distortion, and coma, respectively, for Numerical Example 4, wide-angle end, zoom lens lateral magnification=−1/30.

FIGS. 10E(I)–10E(IV) are plots of spherical aberration, astigmatism, distortion, and coma, respectively, for Numerical Example 4, intermediate focal-length state, zoom lens lateral magnification=−1/30.

FIGS. 10F(I)–10F(IV) are plots of spherical aberration, astigmatism, distortion, and coma, respectively, for Numerical Example 4, telephoto end, zoom lens lateral magnification=−1/30.

DETAILED DESCRIPTION

The following expressions, terms and conventions are used herein:

In an optical diagram, light travels left to right from object to image.

A "positive" distance or direction along an optical axis extends from left to right (i.e., objectwise to imagewise); a "negative" distance or direction extends from right to left (i.e., imagewise to objectwise).

The "radius of curvature" of an optical surface (such as the surface of a lens element) is "positive" when the center of curvature lies to the right of the surface, and "negative" when it lies to the left of the surface.

The "field angle" ($2\omega$) is equal to twice the angle $\omega$ subtended by the principal ray and the optical axis, as measured at the entrance pupil, for the principal ray intersecting the image plane at the edge of the image field.

The "wide-angle end" can be defined as the shortest focal-length state achievable with the zoom lens when the object is at infinity, or the widest field angle achievable with the zoom lens when the object is at a finite distance from the lens.

The "telephoto end" can be defined as the longest focal-length state achievable with the zoom lens when the object is at infinity, or the narrowest field angle achievable with the zoom lens when the object is at a finite distance from the lens.

The "intermediate focal-length state" is a predetermined focal-length state between the wide-angle and telephoto ends.

The "zoom ratio" (Z) is the ratio of the focal length of the zoom lens at the telephoto end to the focal length of the zoom lens at the wide-angle end.

The "Abbe number" (V) is the ratio $(n_D-1)/(n_F-n_C)$, where $N_D$ is the index of refraction in D-line light (589.3 nanometer wavelength), $n_F$ is the index of refraction in F-line light (486.1 nanometer wavelength), and $n_C$ is the index of refraction in C-line light (656.3 nanometer wavelength).

The "back focus" ($B_f$) is the distance along the optical axis between the lens surface closest to the image plane and the image plane.

The "reference sphere" is the spherical surface component of an aspherical surface, i.e., the reference sphere is the surface of the asphere when the aspheric coefficients are zero and the conic coefficient is one.

"Lateral magnification" is the ratio of the image height h' to the object height h, wherein h' and h are measured in a direction perpendicular to the optical axis.

The present invention provides, inter alia, a wide-angle, high-zoom-ratio zoom lens having a minimum number of lens elements and being of compact and simple configuration.

Figure 1:
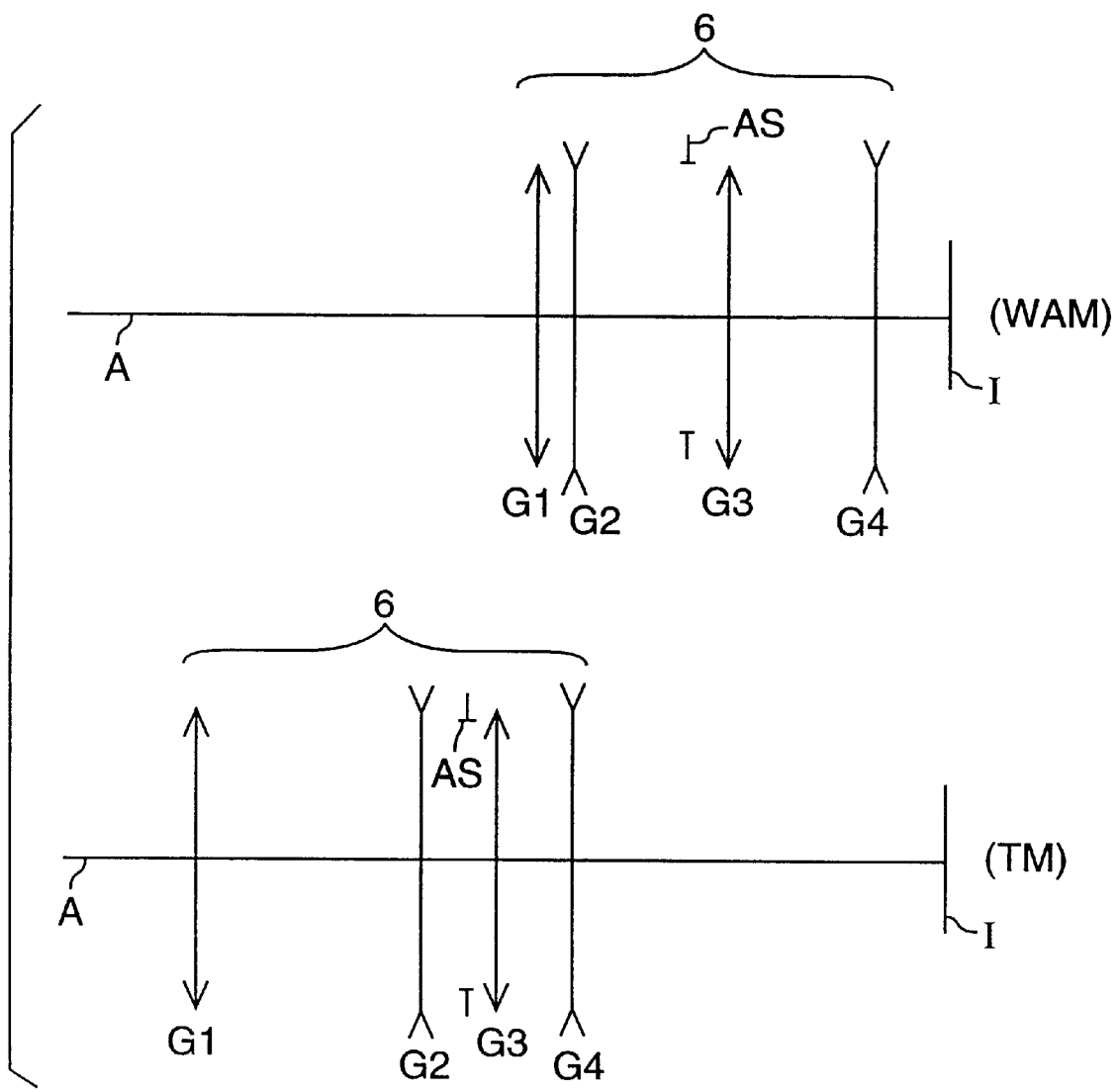
FIG. 1 is a schematic optical diagram of a zoom lens according to the present invention, including relative positions of these groups at the wide-angle end and the telephoto end for the zoom lens.

FIG. 1 provides a general schematic optical diagram of one embodiment of a zoom lens 6 according to the present invention showing relative positions of four movable lens groups for imaging at the wide-angle end (WAM) and the telephoto end (TM) of the zooming range. The zoom lens 6 comprises the following axially movable lens groups and components, arranged from the object side of the zoom lens to the image side of the zoom lens along optical axis A: (a) a first movable lens group G1 having positive refractive power; (b) a second movable lens group G2 having negative refractive power; (c) an aperture stop AS; (d) a third movable lens group G3 having positive refractive power; and (e) a fourth movable lens group G4 having negative refractive power. As the lens is zoomed from the wide-angle end to the telephoto end, the lens groups G1–G4 all move objectwise such that the air space between lens groups G1 and G2 axially expands, the air space between lens groups G2 and G3 axially contracts, and the air space between lens groups G3 and G4 axially contracts.

Figure 2:
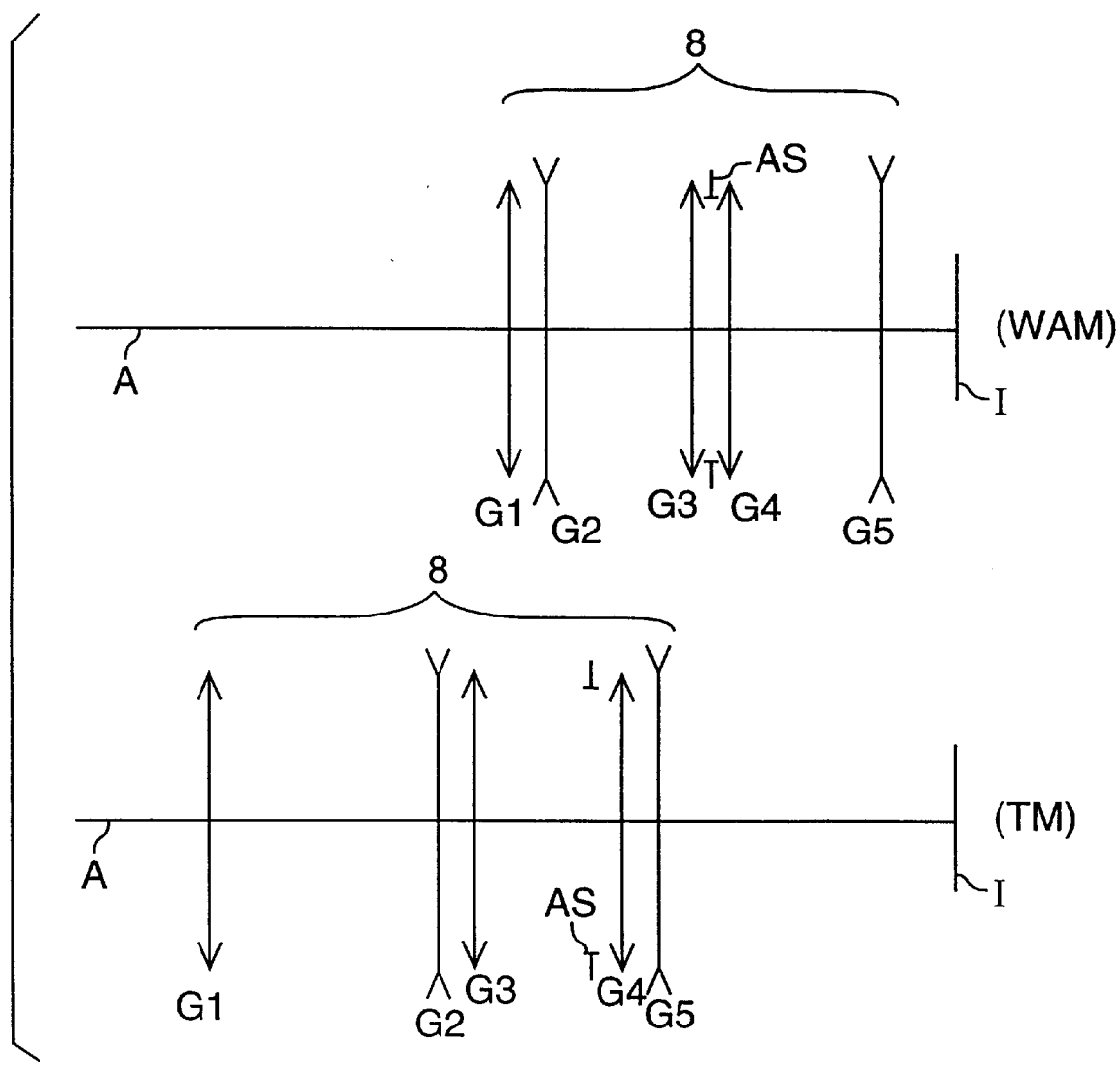
FIG. 2 is a schematic optical diagram of lens groups comprising a zoom lens according to the present invention, including relative positions of these groups at the wide-angle end and the telephoto end.

FIG. 2 provides a general schematic optical diagram of another embodiment of a zoom lens 8 according to the present invention showing relative positions of five movable lens groups for imaging at the wide-angle end (WAM) and the telephoto end (TM) of the zooming range. The zoom lens 8 comprises the following axially movable lens groups and components, arranged from the object side to the image side along optical axis A: (a) a first movable lens group G1 having positive refractive power; (b) a second movable lens group G2 having negative refractive power; (c) a third movable lens group G3 having positive refractive power; (d) an aperture stop AS; (e) a fourth movable lens group G4 having negative refractive power; and (f) a fifth movable lens group G5 having negative refractive power.

As the lens 8 is zoomed from the wide-angle end to the telephoto end, the lens groups all move objectwise such that the air space between lens groups G1 and G2 axially expands, the air space between lens groups G2 and G3 axially contracts, the air space between lens groups G3 and G4 axially increases, and the air space between lens groups G4 and G5 axially decreases.

A zoom lens according to the present invention preferably is configured so that each of the movable lens groups contributes its proportional share to the overall zoom range of the lens. This provides for better control of aberrations during zooming, and a reduction in the number of lens elements comprising the lens groups.

In a zoom lens according to the present invention having at least four movable lens groups, the rearmost (i.e., most imagewise) movable lens group has a negative refractive power (similar to conventional zoom lenses that are not restricted in back focus). To range wide-angle, the back focus at the wide-angle end is shortened, so the off-axis ray height at the rearmost movable lens group is away from the axis for coma aberration correction at any image height. Also, the variation in back focus during zooming is increased and the change in the off-axis ray height at the rearmost movable lens group is increased during zooming; finally, the variation of the coma aberration during zooming is controlled.

Furthermore, in a zoom lens according to the present invention, the frontmost (i.e., most objectwise) movable lens group has positive refractive power to reduce the total length of the zoom lens at the telephoto end. But, by increasing the change in total lens length (i.e., the axial distance from the most objectwise lens surface to the image plane) during zooming, and by bringing closer to the optical axis the height of the off-axis ray at the frontmost movable lens group in the wide-angle state, the diameter of the front lens group can be made smaller, thereby improving compactness.

Furthermore, according to the present invention, it is preferred that the total number of lens elements in the zoom lens be no greater than two times the number of movable lens groups. Thus, each movable lens group preferably comprises less than two lens elements. This allows for a more compact zoom lens design with a high zoom ratio. This also allows for a more even distribution of aberration correction among the movable lens groups.

Further according to the present invention, the second movable lens group (arranged at the image side of the frontmost movable lens group) preferably has a negative refractive power. Thus, during zooming toward the wide-angle end, as the first and second movable lens groups move closer together, sufficient back focus is retained, and positive distortion is favorably corrected. Also, by widening the air space between the first and second movable lens groups during zooming toward the telephoto end, the total length of the zoom lens is shortened to the focal length.

It is also preferred that one or more of the following four conditions be satisfied. According to the best mode, all four of the following conditions are preferably satisfied.

The first condition relates to the change in back focus experienced during zooming between the wide-angle end and the telephoto end, and is expressed as:

$$0.3 < (f_W - B_{fW})/(f_T - B_{fT}) < 0.54 \quad (1)$$

wherein $f_W$ is the focal length of the zoom lens at the wide-angle end, $f_T$ is the focal length of the zoom lens at the telephoto end, $B_{fW}$ is the back focus at the wide-angle end, and $B_{fT}$ is the back focus at the telephoto end.

If $(f_W-B_{fW})/(f_T-B_{fT})$ were to exceed the upper limit of condition (1), then the change in the magnification of the rearmost lens group during zooming would be too great. This would result in an excessive variation of off-axis aberrations arising in the rearmost movable lens group during zooming.

If $(f_W-B_{fW})/(f_T-B_{fT})$ were to be below the lower limit of condition (1), then the change in the magnification of the rearmost lens group during zooming would be too small. Even though excessive variation of off-axis aberrations arising in the most imagewise movable lens group during zooming could still be adequately controlled in this situation, such aberrations in the other lens groups could not be adequately controlled, thereby making it impossible to maintain good performance.

The second condition relates to keeping the zoom lens compact while maintaining high-performance imaging, and is expressed as:

$$0.8 < f_1/(f_W \cdot f_T)^{1/2} < 1.4 \quad (2)$$

wherein $f_1$ is the focal length of the frontmost lens group G1.

If $f_1/(f_W \cdot f_T)^{1/2}$ were to exceed the upper limit of condition (2), then the refractive power of the first movable lens group G1 would be unacceptably weak. Consequently, the overall length of the zoom lens would be unacceptably long at the telephoto end.

If $f_1/(f_W \cdot f_T)^{1/2}$ were to be below the lower limit of condition (2), then the refractive power of lens group G1 would be unacceptably strong relative to the other movable lens groups. Consequently, the desired even distribution of refractive power among the movable lens groups would not be even and positive distortion would be difficult to correct.

The third condition pertains to obtaining a sufficient back focus at the wide-angle end while satisfactorily correcting positive distortion, and is expressed as:

$$0.15 < |f_2|/f_1 < 0.6 \quad (3)$$

wherein $f_2$ is the focal length of lens group G2 (and lens group G2 has negative refractive power).

If $|f_2|/f_1$ were to exceed the upper limit of condition (3), then the refractive power of the second movable lens group G2 would be unacceptably weak relative to the refractive power of the frontmost movable lens group G1. Consequently, it would be extremely difficult to obtain a sufficiently long back focus and to correct positive distortion.

If $|f_2|/f_1$ were to be below the lower limit of condition (3), then the refractive power of the second movable lens group G2 would be unacceptably strong relative to the refractive power of the most objectwise movable lens group G1. As a result, the overall length of the zoom lens at the telephoto end would be too great and compactness could not be achieved. In order to attain maximal compactness and distortion correction, the lower limit on condition (3) preferably should be 0.2, and the upper limit on condition (3) preferably should be 0.5.

As discussed above, the movable lens groups constituting a zoom lens according to the present invention are disposed sequentially on the optical axis, objectwise to imagewise, with the first movable lens group G1 having positive refractive power and the second movable lens group having negative refracting power. The fourth condition relates to the lateral magnification of the second movable lens group G2 and is expressed as:

$$-1 < \beta_{2W} < -0.2 \quad (4)$$

wherein $\beta_{2W}$ is the lateral magnification of the second movable lens group G2 at the wide-angle end. The lateral magnification of lens group G2 depends on the position of the "object" for the lens group G2. Since the "object" for lens group G2 is the image formed by the lens group which is positioned on the object side of the lens group G2, condition (4) is essentially a condition on the combined focal length of the first movable lens group G1 and the second movable lens group G2 on the wide-angle end.

If $\beta_{2W}$ were to exceed the upper limit of condition (4), then the combined refractive power of lens groups G1 and G2 would be sufficiently strong to obtain a sufficiently long back focus at the wide-angle end. However, the difference in height between the off-axis and axial rays at the second movable lens group G2 would be too small. As a result, independently correcting axial and off-axis aberrations would be too difficult.

If $\beta_{2W}$ were to be below the lower limit of condition (4), then the combined refractive power of lens groups G1 and G2 would be too weak for attaining a sufficiently long back focus. In addition, the diameter of the most imagewise movable lens group would have to be unacceptably great.

NUMERICAL EXAMPLES

The following Numerical Examples 1 through 4 pertain to representative zoom-lens embodiments according to the present invention. The embodiments set forth in Numerical Examples 1 and 2 comprise (see FIG. 1), in sequence coaxially objectwise to imagewise, the following components: a first lens group G1 having positive refractive power, a second lens group G2 having negative refractive power, an aperture stop AS, a third lens group G3 having positive refractive power, and a fourth lens group G4 having negative refractive power. FIG. 1 also shows the configuration of the lens groups in the wide-angle end (WAM) and telephoto end (TM) of the zoom lens.

The embodiments set forth in Numerical Examples 3 and 4 comprise (see FIG. 2), in sequence coaxially objectwise to imagewise, the following components: a first lens group G1 having positive refractive power, a second lens group G2 having negative refractive power, an aperture stop AS, a third lens group G3 having positive refractive power, an aperture stop AS, a fourth lens group having refractive power, and a fifth lens group G5 having negative refractive power. FIG. 2 also shows the movements of the individual lens groups during zooming from the wide-angle end (WAM) to the telephoto end (TM).

Each Numerical Example is set forth in detail in Tables 1–5, 6–10, 7–15, and 16–20, respectively, wherein the variables set forth in TABLE A, below, are used, wherein all distances are in mm and refractive indices are for d-line light ($\lambda$=587.6 nm):

TABLE A

| | |
|---|---|
| f | overall focal length of the zoom lens |
| F/# | F-number |
| 2ω | field angle in the wide-angle end |
| $B_f$ | distance along the optical axis between the lens surface closest to the image plane and the image plane (back focus) |
| $d_{object}$ | distance between the most objectwise lens-element surface of the zoom lens and the object |
| $f_1$ | focal length of the first movable lens. group G1 |
| $f_2$ | focal length of the second movable lens group G2 |
| $f_W$ | focal length of the zoom lens at the wide-angle end |
| $f_T$ | focal length of the zoom lens at the telephoto end |
| $B_{fW}$ | back focus of the zoom lens. at the wide-angle end |
| $B_{fT}$ | back focus of the zoom lens at the telephoto end |
| $\beta_{2W}$ | lateral magnification of the second movable lens group G2 at the wide-angle end |
| S | lens-element surface number, numbered from the object side to the image side |
| r | radius of curvature of a lens-element surface |
| d | the distance between adjacent lens-element surfaces |
| n | refractive index |
| $V_d$ | Abbe number |

TABLE A-continued k     conic coefficient
$C_n$     nth order aspheric coefficient.

lens-element surface of the zoom lens and the object.

In Tables 1, 6, 11, and 16, an aspherical surface is indicated by an "*" adjacent corresponding surface number, and the radius of curvature given in each table for an aspheric surface is that for the reference spherical surface. The shape of an aspherical surface is expressed as:

$$X(y) = \{(y^2/r)/[1+(1-ky^2/r^2)^{1/2}]\} + C_2 y^2 + C_4 y^4 + C_6 y^6 + C_8 y^8 + C_{10} y^{10} + \ldots \quad [\text{Eq. 2}]$$

wherein y is the height of the lens surface as measured in a direction perpendicular to the optical axis A, r is the radius of curvature of the reference sphere, k is the conic coefficient, and $C_n$ is the nth order aspheric coefficient. The function X(y) of Eq. 2 describes the axial distance of the aspheric surface relative to a reference sphere centered on the optical axis and touching the surface of the asphere on the optical axis.

FIGS. 4A–4F, 6A–6F, 8A–8F, and 10A–10F are aberration plots for Numerical Examples 1, 2, 3, and 4, respectively, as described above.

In FIGS. 4A(I), 4D(I), 6A(I), 6D(I), 8A(I), 8D(I), 10A(I), and 10D(I), the broken line represents the sine condition.

In FIGS. 4A(II), 4D(II), 6A(II), 6D(II), 8A(II), 8D(II), 10A(II), and 10D(II), the broken line represents the meridional image surface (indicated by an "M"), and the solid line represents the sagittal image surface (indicated by an "S"). "Y" denotes the image height.

In FIGS. 4A(III), 4D(III), 6A(III), 6D(III), 8A(III), 8D(III), 10A(III), and 10D(III), "Y" denotes the image height.

In FIGS. 4A(VI), 4D(VI), 6A(VI), 6D(VI), 8A(VI), 8D(VI), 10A(VI), and 10D(VI), "Y" denotes the image height.

NUMERICAL EXAMPLE 1

Figure 3:
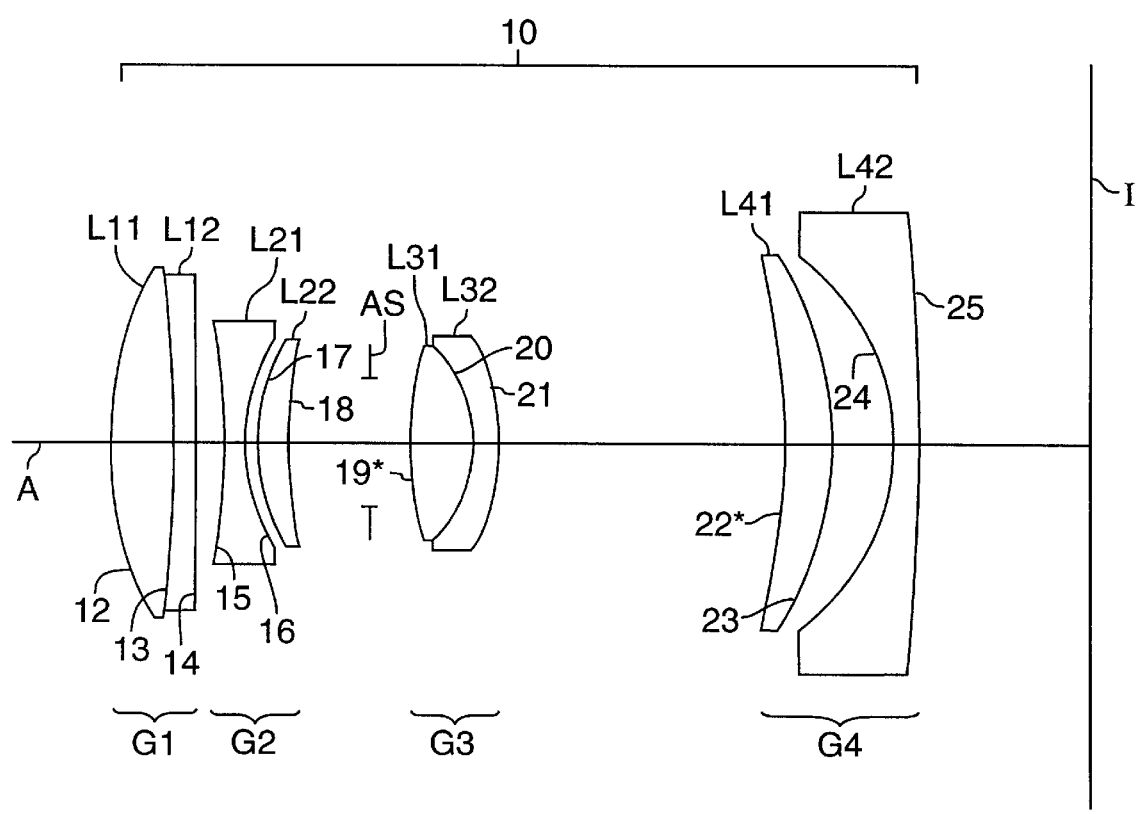
FIG. 3 is an optical diagram of the embodiment of Numerical Example 1 at the wide-angle end.

FIG. 3 depicts an optical diagram of the embodiment 10 of Numerical Example 1 set at the wide-angle end (WAM). Lens group G1 comprises a compound lens comprising a biconvex lens element L11 and a negative meniscus lens element L12 having an imagewise convex surface 14. Lens group G2 comprises a biconcave lens element L21 and a positive meniscus lens element L22 having an objectwise convex surface 17. Lens group G3 comprises a compound lens comprising a biconvex lens element L31 having an aspherical objectwise convex surface 19*, and a negative meniscus lens element L32 having an imagewise convex surface 21. Lens group G4 comprises a positive meniscus lens element L41 having an aspherical objectwise concave surface 22*, and a negative meniscus lens element L42 having an imagewise convex surface 25. Aperture stop AS is disposed between lens groups G2 and G3 and moves with lens group G3 during zooming.

Focusing on a close-range object is preferably achieved using this Numerical Example by axially moving lens group G4.

With respect to this Numerical Example, the various optical parameters are listed in Tables 1 through 5, below.

TABLE 1 f    = 38.8 – 75.3 – 110.5 mm
F/# = 4.3 – 6.2 – 8.1
2ω = 59.8 – 31.3 – 21.8°

| Surface | r | d | n | $V_d$ |
|---|---|---|---|---|
| 12 | 26.0869 | 3.893 | 1.51860 | 69.98 |
| 13 | –77.9184 | 1.381 | 1.86074 | 23.01 |
| 14 | –374.3615 | (d14) | | |
| 15 | –35.9139 | 1.256 | 1.74810 | 52.30 |
| 16 | 12.8896 | 0.879 | | |
| 17 | 14.1455 | 1.884 | 1.86074 | 23.01 |
| 18 | 33.2668 | (d18) | | |
| AS | ∞ | 2.512 | | |
| 19* | 26.2085 | 4.019 | 1.51860 | 69.98 |
| 20 | –8.5578 | 1.507 | 1.80518 | 25.35 |
| 21 | –13.0283 | (d21) | | |
| 22* | –34.9909 | 2.888 | 1.80518 | 25.35 |
| 23 | –21.7564 | 4.019 | | |
| 24 | –14.2192 | 1.507 | 1.77279 | 49.45 |
| 25 | –133.1266 | ($B_f$) | | |

TABLE 2

Aspherical Surface Data

| Surface 19* | | Surface 22* | |
|---|---|---|---|
| k = | 1.0000 | k = | 1.0000 |
| C2 = | 0.0000 | C2 = | 0.0000 |
| C4 = | –5.29510 × 10⁻⁵ | C4 = | 1.60890 × 10⁻⁵ |
| C6 = | 6.25600 × 10⁻⁷ | C6 = | –8.02690 × 10⁻⁸ |
| C8 = | –2.31700 × 10⁻⁸ | C8 = | 9.73830 × 10⁻¹⁰ |
| C10 = | 3.96480 × 10⁻¹⁰ | C10 = | –1.31510 × 10⁻¹² |

TABLE 3

Variable Air Spaces For Zooming

| Variable | Wide-angle end | Intermediate focal-length state | Telephoto end |
|---|---|---|---|
| f | 38.8047 | 75.3488 | 110.5116 |
| d14 | 1.8467 | 13.8498 | 15.8647 |
| d18 | 5.2744 | 2.1059 | 1.5070 |
| d21 | 18.2712 | 7.2857 | 1.8837 |
| $B_f$ | 10.6744 | 30.9922 | 56.2388 |

TABLE 4

Zoom Lens Lateral Magnification = –1/30

| Variable | Wide-angle end | Intermediate focal-length state | Telephoto end |
|---|---|---|---|
| f | 38.8047 | 75.3488 | 110.5116 |
| $d_{object}$ | 1122.4586 | 2233.7375 | 3299.4408 |
| Displacement | 1.7533 | 0.8618 | 0.5447 |

TABLE 5

Values of the Conditions $f_1 = 55.9668$
$f_2 = -23.7265$
$(f_W - B_{fW})/(f_T - B_{fT}) = 0.518$
$f_1/(f_W \cdot f_T)^{1/2} = 0.855$
$|f_2|/f_1 = 0.424$
$\beta_{2W} = -0.890$ With respect to this Numerical Example, FIGS. 4A(I–IV), 4B(I–IV), and 4C(I–IV) show plots corresponding to the wide-angle end, the intermediate focal-length state, and the telephoto end, respectively, for spherical aberration 4A(I), 4B(I) and 4C(I)), astigmatism (6A(II), 4B(II) and 4C(II)), distortion (4A(III), 4B(III) and 4C(III)) and coma (4A(IV), 4B(IV) and 4C(IV)) for an effectively infinitely distant object. FIGS. 4D(I–IV), 4E(I–IV), and 4F(I–IV) show plots corresponding to the wide-angle end, the intermediate focal-length state, and the telephoto end, respectively, for spherical aberration (4D(I), 4E(I) and 4F(I)), astigmatism (4D(II), 4E(II) and 4F(II)), distortion (4D(III), 4E(III) and 4F(III)) and coma (4D(IV), 4E(IV) and 4F(IV)) for a zoom lens according to this Numerical Example exhibiting a zoom lens lateral magnification of −1/30.

As is clear from the foregoing plots, the configuration of this Numerical Example is well-corrected for aberrations over the entire range of focal lengths and is suitable for achieving the objectives of the present invention.

NUMERICAL EXAMPLE 2

FIG. 5 depicts an optical diagram of the embodiment 100 of Numerical Example 2 set at the wide-angle end. Lens group G1 comprises a compound lens comprising a biconvex lens element L11 and a negative meniscus lens element L12 having an imagewise convex surface 114. Lens group G2 comprises a biconcave lens element L21 and a positive meniscus lens element L22 having an objectwise convex surface 117. Lens group G3 comprises a compound lens comprising a biconvex lens element L31 having an aspherical objectwise convex surface 119*, and a negative meniscus lens element L32 having an imagewise convex surface 121. Lens group G4 comprises a positive meniscus lens element L41 having an aspherical objectwise concave surface 122*, and a negative meniscus lens element L42 having an imagewise convex surface 125. Aperture stop AS is disposed between lens groups G2 and G3 and moves with lens group G3 during zooming.

Focusing on a close-up object is preferably achieved using this Numerical Example by axially moving lens group G4.

With respect to this Numerical Example, the various optical parameters are listed in Tables 6 through 10, below.

TABLE 6 f = 38.8 − 69.6 − 110.5 mm
F/# = 4.3 − 6.4 − 8.0
2ω = 59.2 − 33.8 − 21.6°

| Surface | r | d | n | $V_d$ |
|---|---|---|---|---|
| 112 | 29.5910 | 3.893 | 1.51860 | 69.98 |
| 113 | −62.5551 | 1.381 | 1.86074 | 23.01 |
| 114 | −162.4925 | (d114) | | |
| 115 | −28.7757 | 1.256 | 1.74810 | 52.30 |
| 116 | 14.0174 | 0.879 | | |
| 117 | 16.0209 | 1.884 | 1.86074 | 23.01 |
| 118 | 49.6705 | (d118) | | |
| AS | ∞ | 2.512 | | |
| 119 | 27.8714 | 4.019 | 1.51860 | 69.98 |
| 120 | −7.9972 | 1.507 | 1.80518 | 25.35 |
| 121 | −11.8807 | (d121) | | |
| 122* | −78.0978 | 2.888 | 1.80518 | 25.35 |
| 123 | −26.5921 | 3.712 | | |
| 124 | −14.1721 | 1.507 | 1.77279 | 49.45 |
| 125 | 165.6024 | ($B_f$) | | |

TABLE 7

Aspherical Surface Data

| Surface 119* | | | Surface 122* | | |
|---|---|---|---|---|---|
| k | = | 1.0000 | k | = | 1.0000 |
| C2 | = | 0.0000 | C2 | = | 0.0000 |
| C4 | = | −4.86550 × 10$^{-5}$ | C4 | = | 1.98590 × 10$^{-5}$ |
| C6 | = | −2.02070 × 10$^{-8}$ | C6 | = | 3.91880 × 10$^{-8}$ |
| C8 | = | 4.01500 × 10$^{-9}$ | C8 | = | −1.56540 × 10$^{-10}$ |
| C10 | = | 7.46300 × 10$^{-11}$ | C10 | = | 3.28890 × 10$^{-12}$ |

TABLE 8

Variable Air spaces For Zooming

| Variable | Wide-angle end | Intermediate focal-length state | Telephoto end |
|---|---|---|---|
| f | 38.7916 | 69.6425 | 110.5176 |
| d114 | 2.1349 | 8.7907 | 16.3256 |
| d118 | 5.2744 | 3.3907 | 1.5070 |
| d121 | 15.6977 | 7.5349 | 1.8837 |
| $b_f$ | 12.9903 | 34.6862 | 56.0412 |

TABLE 9

Zoom Lens Lateral Magnification = −1/30

| Variable | Wide-angle end | Intermediate focal-length state | Telephoto end |
|---|---|---|---|
| f | 38.7916 | 69.6425 | 110.5176 |
| $d_{object}$ | 1129.7352 | 2071.0693 | 3297.0784 |
| Displacement | 1.3400 | 0.6178 | 0.4827 |

TABLE 10

Values of the Conditions $f_1 = 57.7160$
$f_2 = -24.3316$
$(f_W - B_{fW})/(f_T - B_{fT}) = 0.473$
$f_1/(f_W \cdot f_T)^{1/2} = 0.882$
$|f_2|/f_1 = 0.421$
$\beta_{2W} = -0.860$ With respect to this Numerical Example, FIGS. 6A(I–IV), 6B(I–IV), and 6C(I–IV) show plots corresponding to the wide-angle end, the intermediate focal-length state, and the telephoto end, respectively, for spherical aberration (6A(I), 6B(I) and 6C(I)), astigmatism (6A(II), 6B(II) and 6C(II)), distortion (6A(III), 6B(III) and 6C(III)) and coma (6A(IV), 6B(IV) and 6C(IV)) for an effectively infinitely distant object. FIGS. 6D(I–IV), 6E(I–IV), and 6F(I–IV) show aberration plots corresponding to the wide-angle end, the intermediate focal-length state, and the telephoto end, respectively, for spherical aberration (6D(I), 6E(I) and 6F(I)), astigmatism (6D(II), 6E(II) and 6F(II)), distortion (6D(III), 6E(III) and 6F(III)) and coma (6D(IV), 6E(IV) and 6F(IV)) for a zoom lens according to this Numerical Example exhibiting a zoom lens lateral magnification of −1/30.

As is clear from the foregoing plots, the configuration of this Numerical Example is well-corrected for aberrations over the entire range of focal lengths and is suitable for achieving the objectives of the present invention.

NUMERICAL EXAMPLE 3

Figure 7:
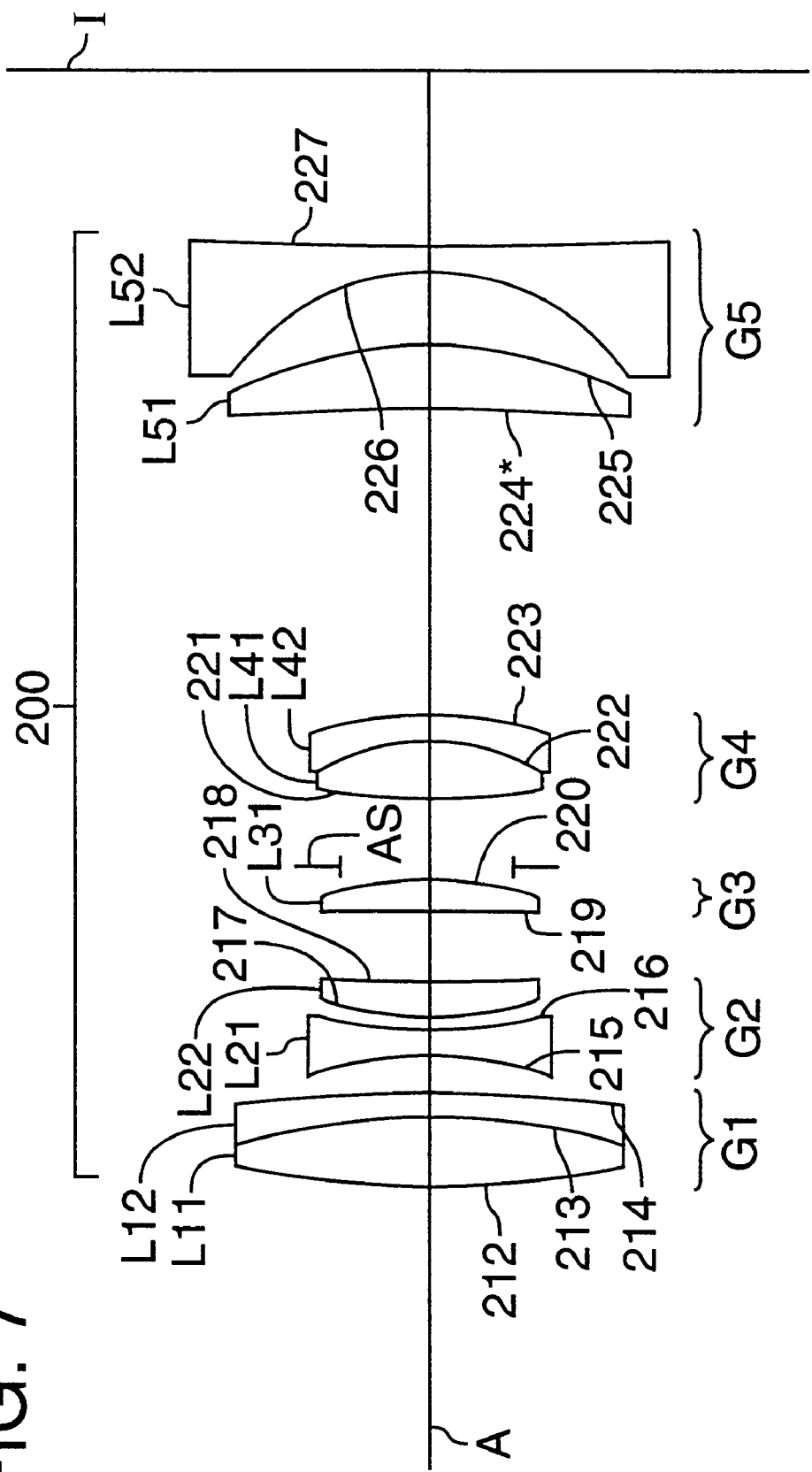
FIG. 7 is an optical diagram of the embodiment or Numerical Example 3 in the wide-angle end.

FIG. 7 depicts an optical diagram of the embodiment 200 of Numerical Example 3 set at the wide-angle end. Lens group G1 comprises a compound lens comprising a biconvex lens element L11 and a negative meniscus lens element L12 having an imagewise convex surface 214. Lens group G2 comprises a biconcave lens element L21 and a positive meniscus lens element L22 having an objectwise convex surface 217. Lens group G3 comprises a biconvex lens element L31. Lens group G4 comprises a compound lens comprising a biconvex lens element L41, and a negative meniscus lens element L42 having an imagewise convex surface 223. Lens group G5 comprises a positive meniscus lens element L51 having an aspherical objectwise concave surface 224*, and a negative meniscus lens element L52 having an imagewise concave surface 227. Aperture stop AS is disposed between lens groups G3 and G4 and moves with lens group G4 during zooming.

Focusing on a close-up object using this Numerical Example is preferably achieved by axially moving lens group G3.

During zooming, it is preferable to axially move lens groups G2 and G4 in synchrony.

With respect to this Numerical Example, the various optical parameters are listed in Tables 11 through 15, below.

TABLE 11 f   = 38.8 – 70.9 – 110.5 mm
F/# = 4.0 – 6.2 – 8.2
2ω  = 58.1 – 32.9 – 21.5°

| Surface | r | d | n | $V_d$ |
|---|---|---|---|---|
| 212 | 48.0105 | 3.893 | 1.51860 | 69.98 |
| 213 | –39.1422 | 1.381 | 1.86074 | 23.01 |
| 214 | –65.9659 | (d214) | | |
| 215 | –19.7090 | 1.256 | 1.74810 | 52.30 |
| 216 | 20.7503 | 0.879 | | |
| 217 | 21.3306 | 1.884 | 1.86074 | 23.01 |
| 218 | 89.6266 | (d218) | | |
| 219 | 2724.3381 | 1.758 | 1.51860 | 69.98 |
| 220 | –21.3496 | (d220) | | |
| AS  | ∞ | 2.512 | | |
| 221 | 37.3105 | 4.019 | 1.51860 | 69.98 |
| 222 | –11.8146 | 1.507 | 1.80518 | 25.35 |
| 223 | –21.4096 | (d223) | | |
| 224* | –64.4997 | 3.516 | 1.80518 | 25.35 |
| 225 | –25.3916 | 4.144 | | |
| 226 | –13.7055 | 1.507 | 1.77279 | 49.45 |
| 227 | 384.3533 | (Bf) | | |

TABLE 12

Aspherical Surface Data

Surface 224*

| k | = | 1.0000 |
|---|---|---|
| C2 | = | 0.0000 |
| C4 | = | $1.65290 \times 10^{-5}$ |
| C6 | = | $8.70800 \times 10^{-8}$ |
| C8 | = | $-3.69510 \times 10^{-10}$ |
| C10 | = | $4.71940 \times 10^{-12}$ |

TABLE 13

Variable Air Spaces for Zooming

| Variable | Wide-angle end | Intermediate focal-length state | Telephoto end |
|---|---|---|---|
| f | 38.7897 | 70.9401 | 110.4900 |
| d214 | 2.0894 | 9.4186 | 16.2726 |
| d218 | 4.0239 | 2.7681 | 1.5123 |
| d220 | 2.7541 | 4.0099 | 5.2657 |
| d223 | 17.2190 | 8.1628 | 3.0358 |
| $B_f$ | 9.9388 | 31.9884 | 53.1636 |

TABLE 14

Zoom Lens Lateral Magnification = –1/30

| Variable | Wide-angle end | Intermediate focal-length state | Telephoto end |
|---|---|---|---|
| f | 38.7916 | 69.6425 | 110.5176 |
| $d_{object}$ | 1129.7352 | 2071.0693 | 3297.0784 |
| Displacement | 1.3400 | 0.6178 | 0.4827 |

TABLE 15

Values of the Conditions $f_1 = 66.8112$
$f_2 = -23.9932$
$(f_W - B_{fW})/(f_T - B_{fT}) = 0.503$
$f_1/(f_W \cdot f_T)^{1/2} = 1.021$
$|f_2|/f_1 = 0.359$
$\beta_{2W} = -0.613$ With respect to this Numerical Example, FIGS. 8A(I–IV), 8B(I–IV), and 8C(I–IV) show plots corresponding to the wide-angle end, the intermediate focal-length state, and the telephoto end, respectively, for spherical aberration (8A(I), 8B(I) and 8C(I)), astigmatism (8A(II), 8B(II) and 8C(II)), distortion (8A(III), 8B(III) and 8C(III)) and coma (8A(IV), 8B(IV) and 8C(IV)) for an effectively infinitely distant object. FIGS. 8D(I–IV), 8E(I–IV), and 8F(I–IV) show plots corresponding to the wide-angle end, the intermediate focal-length state, and the telephoto end, respectively, for spherical aberration (8D(I), 8E(I) and 8F(I)), astigmatism (8D(II), 8E(II) and 8F(II)), distortion (8D(III), 8E(III) and 8F(III)) and coma (8D(IV), 8E(IV) and 8F(IV)) for a zoom lens according to this Numerical Example exhibiting a zoom lens lateral magnification of –1/30.

As is clear from the foregoing plots, the configuration of this Numerical Example is well-corrected for aberrations over the entire range of focal lengths and is suitable for achieving the objectives of the present invention.

NUMERICAL EXAMPLE 4

Figure 9:
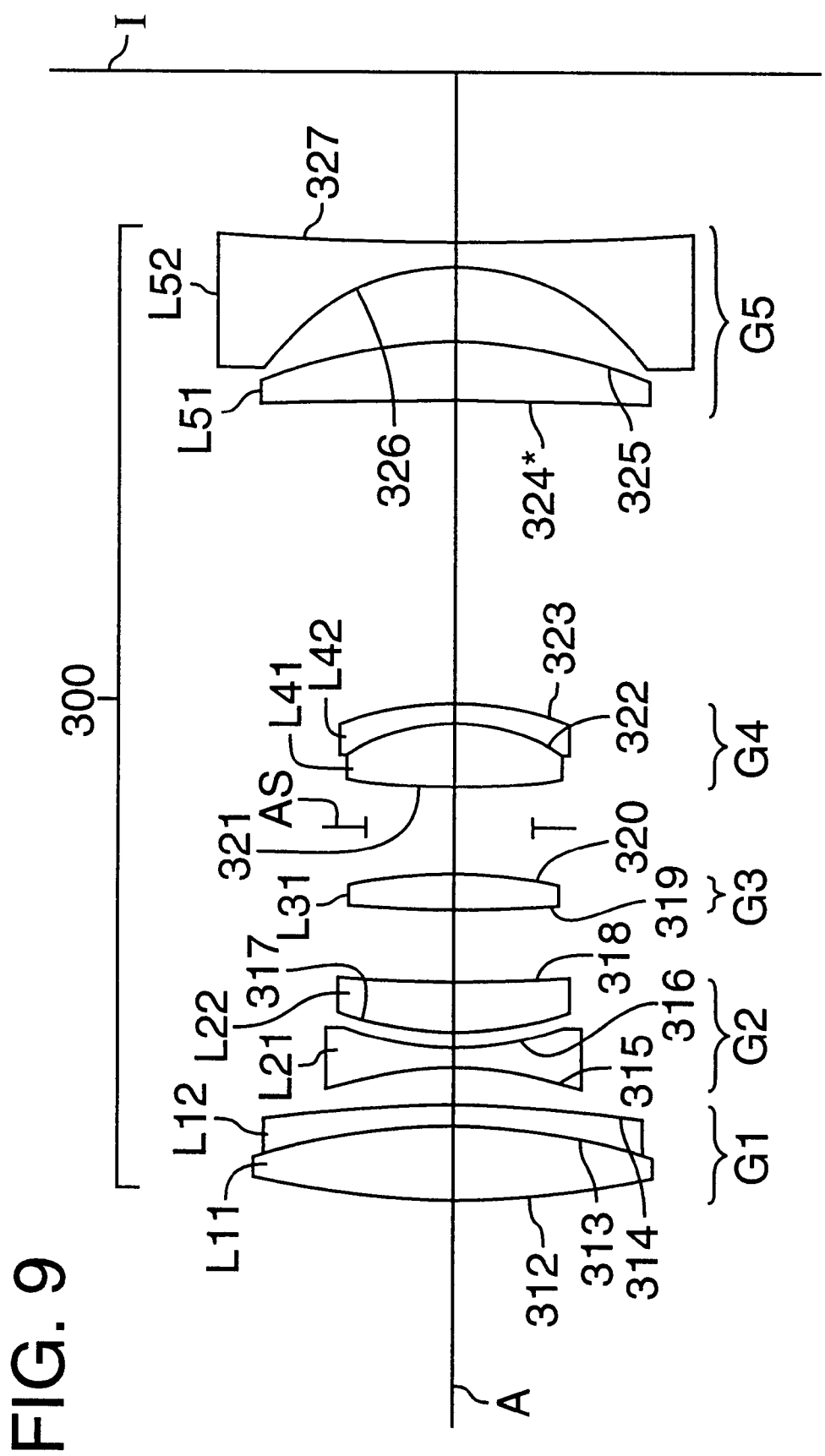
FIG. 9 is an optical diagram of the embodiment or Numerical Example 4 in the wide-angle end.

FIG. 9 depicts an optical diagram of the embodiment of Numerical Example 4 set at the wide-angle end. Lens group G1 comprises a compound lens comprising a biconvex lens element L11 and a negative meniscus lens element L12 having an imagewise convex surface 314. Lens group G2 comprises a biconcave lens element L21 and a positive meniscus lens element L22 having an objectwise convex surface 317. Lens group G3 comprises a biconvex lens element L31. Lens group G4 comprises a compound lens comprising a biconvex lens element L41 and a negative meniscus lens element L42 having an imagewise convex surface 323. Lens group G5 comprises a positive meniscus lens element L51 having an aspherical objectwise concave surface 324*, and a negative meniscus lens element L52 having an imagewise concave surface 327. Aperture stop AS is disposed between lens groups G3 and G4 and moves with lens group G4 during zooming.

Focusing on a close-up object using this Numerical Example is preferably achieved by axially moving lens group G3.

During zooming, it is preferable to axially move lens groups G2 and G4 in synchrony.

With respect to this Numerical Example, the various optical parameters are listed in Tables 16 through 20, below.

TABLE 16 f = 38.8–75.3–121.8 mm
F/# = 4.1–6.5–9.1
2ω = 58.7–30.9–19.6°

| Surface | r | d | n | $V_d$ |
|---|---|---|---|---|
| 312 | 55.8288 | 4.270 | 1.51860 | 69.98 |
| 313 | −36.3508 | 1.256 | 1.86074 | 23.01 |
| 314 | −59.4438 | (d314) | | |
| 315 | −20.7606 | 1.130 | 1.77728 | 49.45 |
| 316 | 20.1086 | 0.879 | | |
| 317 | 20.4284 | 2.888 | 1.86074 | 23.01 |
| 318 | 78.7337 | (d318) | | |
| 319 | 72.6198 | 2.135 | 1.51680 | 64.10 |
| 320 | −25.7586 | (d320) | | |
| AS | ∞ | 2.261 | | |
| 321 | 48.1014 | 3.767 | 1.56384 | 60.69 |
| 322 | −11.4959 | 1.130 | 1.80458 | 25.50 |
| 323 | −23.2492 | (d323) | | |
| 324* | −90.8781 | 3.391 | 1.80458 | 25.50 |
| 325 | −30.1177 | 4.395 | | |
| 326 | −13.9004 | 1.381 | 1.74810 | 52.30 |
| 327 | 256.2249 | (Bf) | | |

TABLE 17

Aspherical surface data
Surface 324* k = 1.0000
C2 = 0.0000
C4 = 1.85260 × 10$^{-5}$
C6 = 9.15900 × 10$^{-8}$
C8 = −4.52080 × 10$^{-10}$
C10 = 4.84620 × 10$^{-12}$

TABLE 18

Variable Air spaces for Zooming

| Variable | Wide-angle end | Intermediate focal-length state | Telephoto end |
|---|---|---|---|
| f | 38.8037 | 75.3455 | 121.8076 |
| d314 | 2.1349 | 11.6864 | 17.5309 |
| d318 | 4.2006 | 3.1533 | 1.8837 |
| d320 | 2.7064 | 3.7537 | 5.0233 |
| d323 | 17.6295 | 7.5562 | 2.5116 |
| $b_f$ | 9.7948 | 33.8711 | 59.6989 |

TABLE 19

Zoom Lens Lateral Magnification = −1/30

| Variable | Wide-angle end | Intermediate focal-length state | Telephoto end |
|---|---|---|---|
| f | 38.8037 | 75.3455 | 121.8076 |
| $d_{object}$ | 1110.7525 | 2164.6242 | 3512.7006 |
| Displacement | 1.2780 | 1.1225 | 1.0542 |

TABLE 20

Values of the Conditions $f_1 = 70.3071$
$f_2 = -23.2326$
$(f_W - B_{fW})/(f_T - B_{fT}) = 0.467$
$f_1/(f_W \cdot f_T)^{1/2} = 1.023$
$|f_2|/f_1 = 0.330$
$\beta_{2W} = -0.537$ With respect to this Numerical Example, FIGS. 10A(I–IV), 10B(I–IV), and 10C(I–IV) show plots corresponding to the wide-angle end, the intermediate focal-length state, and the telephoto end, respectively, for spherical aberration (10A(I), 10B(I) and 10C(I)), astigmatism (10A(II), 10B(II) and 10C(II)), distortion (10A(III), 10B(III) and 10C(III)) and coma (10A(IV), 10B(IV) and 10C(IV)) for an effectively infinitely distant object. FIGS. 10D(I–IV), 10E(I–IV), and 10F(I–IV) show plots corresponding to the wide-angle end, the intermediate focal-length state, and the telephoto end, respectively, for spherical aberration (10D(I), 10E(I) and 10F(I)), astigmatism (10D(II), 10E(II) and 10F(II)), distortion (10D(III), 10E(III) and 10F(III)) and coma (10D(IV), 10E(IV) and 10F(IV)) for a zoom lens according to this Numerical Example exhibiting a zoom lens lateral magnification of −1/30.

As is clear from the foregoing plots, the configuration of this Numerical Example is well-corrected for aberrations over the entire range of focal lengths and is suitable for achieving the objectives of the present invention.

It should be noted that, in the zoom lens embodiments according to Numerical Examples 3 and 4 above, the zooming cam and lens barrel can be simplified if certain lens groups move axially in synchrony during zooming, such as for example, lens group G2 and lens group G4.

Moreover, it is possible in a zoom lens according to the present invention to allow one or more of the constituent lens elements or groups to be movable in a direction substantially perpendicular to the optical axis. Generally, such non-axial (i.e., lateral) displacement or "decentration" of a lens element or group in an imaging lens causes a displacement of the image in the image plane (a decentered lens element may be approximately regarded as a centered lens element plus a thin prism). If the non-axial lens element displacement is sufficiently small, and the decentration tolerances not too severe, then any aberrations introduced by the decentered lens element may be very small, and a high-quality displaced image may be obtained. In the present invention, this effect can be exploited to counter undesirable shifts in the image position caused by a variety of effects, such as the shaking of the camera due to unsteady hands, or an unsteady mount.

While the present invention has been described in connection with the preferred embodiments, it will be understood that it is not limited to those embodiments. On the contrary, it is intended to cover all alternatives, modifications, and equivalents as may be included within the spirit and scope of the invention as defined in the appended claims.

What is claimed is:

1. A zoom lens, comprising:
   (a) at least four lens groups that are movable along an optical axis during zooming from a wide-angle end to a telephoto end, the zoom lens having an aspherical surface, and having no greater number of lens elements than two times the number of movable lens groups in the zoom lens;
   (b) the movable lens groups including a most objectwise movable lens group having a positive refractive power, a most imagewise movable lens group having negative refractive power, an intermediate movable lens group with positive refractive power disposed between the most objectwise movable lens group and the most imagewise movable lens group, the intermediate lens group comprising a positive lens element cemented to a negative lens element, a second movable lens group with negative refractive power disposed between the most objectwise movable lens group and the intermediate lens group; and
   (c) the zoom lens having a focal length $f_W$ on the wide-angle end, a focal length $f_T$ at the telephoto end, a back focus $B_{fW}$ at the wide-angle end, a back focus $B_{fT}$ at the telephoto end, and a lateral magnification $\beta_{2W}$ of the second movable lens group at the wide-angle end, the zoom lens satisfying the conditions:

$0.3<(f_W-B_{fW})/(f_T-B_{fT})<0.54-1<\beta_{2W}-0.2.$

2. The zoom lens according to claim 1, wherein the most objectwise movable lens group has a focal length $f_1$, the zoom lens satisfying the condition:

$0.8<f_1/(f_W \cdot f_T)^{1/2}<1.4.$

3. The zoom lens according to claim 1, wherein:
   (a) the most objectwise movable lens group has a focal length $f_1$, and the second movable lens group has a negative refractive power and a focal length $f_2$,
   (b) the second movable lens group and the most objectwise movable lens group have a combined negative refractive power, and
   (c) the zoom lens satisfies the condition:

$0.15<|f_2|/f_1<0.6.$

4. The zoom lens according to claim 3, wherein each of the movable lens groups comprises at least one lens element.

5. The zoom lens according to claim 4, wherein the positive lens element in the intermediate movable lens group is disposed objectwise of the negative lens element of the intermediate movable lens group.

6. The zoom lens according to claim 2, wherein:
   (a) the second movable lens group has negative refractive power and a focal length $f_2$,
   (b) the second movable lens group and the most objectwise movable lens group has a combined negative refractive power, and
   (c) the zoom lens satisfies the condition:

$0.15<|f_2|/f_1<0.6.$

7. The zoom lens according to claim 6, wherein each of the movable lens groups comprises at least one lens element.

8. The zoom lens according to claim 2, wherein the most objectwise movable lens group, the second movable lens group, the intermediate movable lens group, and the most imagewise lens group each consisting of two lens elements.

9. The zoom lens according to claim 8, wherein:
   (a) the most objectwise movable lens group has a focal length $f_1$, and the second movable lens group has a focal length $f_2$,
   (b) the second movable lens group and the most objectwise movable lens group have a combined negative refractive power, and
   (c) the zoom lens satisfies the condition:

$0.15<|f_2|/f_1<0.6.$

10. The zoom lens according to claim 9, wherein each of the movable lens groups comprises at least one lens element.

11. A zoom lens comprising, from an object side to an image side, a first lens group having a positive refractive power, a second lens group having a negative refractive power, a third lens group having a positive refractive power, a fourth lens group having a positive refractive power, and a fifth lens group having a negative refractive power, wherein
    (a) the zoom lens has no more than ten lens elements,
    (b) the zoom lens has a focal length $f_W$ at the wide-angle end, a focal length $f_T$ at the telephoto end, a back focus $B_{fW}$ at the wide-angle end, a back focus $B_{fT}$ at the telephoto end, and a lateral magnification $\beta_{2W}$ of the second lens group at the wide-angle end, and
    (c) the zoom lens satisfying the conditions:

$0.3<(f_W-B_{fW})/(f_T-B_{fT})<0.54-1<\beta_{2W}<-0.2.$

12. The zoom lens according to claim 11, wherein the first lens group has a focal length $f_1$ and the second lens group has a focal length $f_2$, the zoom lens satisfying the condition:

$0.15<|f_2|/f_1<0.6.$

13. A zoom lens comprising, from an object side to an image side, a first lens group having a positive refractive power, a second lens group having a negative refractive power, a third lens group having a positive refractive power and comprising a positive lens element cemented to a negative lens element, and a fourth lens group having a negative refractive power, p1 (a) the zoom lens having no more than eight lens elements and including an aspherical surface,
    (b) the zoom lens having a focal length $f_W$ at the wide-angle end, a focal length $f_T$ at the telephoto end, a back focus $B_{fW}$ at the wide-angle end, a back focus $B_{fT}$ at the telephoto end, and a lateral magnification $\beta_{2W}$ of the second lens group at the wide-angle end, and
    (c) the zoom lens satisfying the conditions:

$0.3<(f_W-B_{fW})/(f_T-B_{fT})<0.54-1<\beta_{2W}<-0.2.$

14. The zoom lens according to claim 13, wherein:
    (a) the first lens group has a focal length $f_1$ and the second lens group has a focal length $f_2$, and
    (b) the zoom lens satisfying the condition:

$0.15<|f_2|/f_1<0.6.$

15. A zoom lens comprising:
    (a) at least four lens groups movable along an optical axis for zooming from a wide-angle end to a telephoto end, the zoom lens including a most objectwise movable lens group having positive refractive power and a focal length $f_1$; a second movable lens group disposed imagewise adjacent the most objectwise movable lens group, the second movable lens group having negative refractive power, a focal length $f_2$, and a lateral magnification $\beta_{2W}$ at the wide-angle end; a third movable lens group juxtaposed imagewise of the second movable lens group, the third movable lens group having a positive refractive power and comprising a positive lens component cemented to a negative lens component; a most imagewise movable lens group having negative refractive power; and an aspherical surface;

(b) the movable lens groups being movable during zooming so as to provide the zoom lens with a range of focal lengths including a focal length $f_W$ at a wide-angle end and a focal length $f_T$ at a telephoto end;

(c) the zoom lens having a back focus $B_{fw}$ at the wide angle end and back focus $B_{fT}$ at the telephoto end; and (d) the zoom lens satisfying the conditions:

$$0.3<(f_W-B_{fW})/(f_T-B_{fT})<0.54 -1<\beta_{2W}<-0.2.$$

and at least one of the following additional conditional conditions:

$$0.15<|f_2|/f_1<0.6 \quad (i)$$

$$0.8<f_1/(f_W \cdot f_T)^{1/2}<1.4 \quad (ii).$$

16. A zoom lens according to claim 15, further comprising an aperture stop disposed objectwise of the two most imagewise movable lens groups.

17. A zoom lens according to claim 15, wherein, during zooming from the wide-angle end to the telephoto end, at least the most objectwise movable lens group and the second movable lens group move axially objectwise.

18. A zoom lens having lens elements and characteristics as set forth in Tables 1 through 5 and Table A, wherein respective elements and characteristic designations are defined in Table A.

19. A zoom lens having lens elements and characteristics as set forth in Tables 6 through 10 and Table A, wherein respective elements and characteristic designations are defined in Table A.

20. A zoom lens having lens elements and characteristics as set forth in Tables 11 through 15 and Table A, wherein respective elements and characteristic designations are defined in Table A.

21. A zoom lens having lens elements and characteristics as set forth in Tables 16 through 20 and Table A, wherein respective elements and characteristic designations are defined in Table A.

22. A zoom lens according to claim 17, further comprising an intermediate movable lens group, having a positive refractive power, disposed imagewise adjacent the second movable lens group, the movable lens groups defining a first air space between the most objectwise and second movable lens groups, a second air space between the second and intermediate movable lens groups, and a third air space between the intermediate and most imagewise movable lens groups, wherein, during zooming from the wide-angle end to the telephoto end, the first air space axially increases, the second air space axially decreases, and the third air space axially decreases.

23. A zoom lens comprising, from an object side to an image side, a first lens group having a positive refractive power and comprising a bi-convex shaped lens element cemented to a negative lens element, a second lens group, a third lens group having a positive refractive power, and a fourth lens group having a negative refractive power, wherein:

(a) the zoom lens has no more than eight lens elements and including an aspherical surface;

(b) the zoom lens has a focal length fw on the wide-angle end, a focal length ft at the telephoto end, a back focus Bfw at the wide-angle end, and a back focus Bft at the telephoto end;

(c) an aperture stop is positioned between the second lens group and the third lens group; and (d) the zoom lens satisfying the conditions:

$$0.3<(fW-BfW)/(ft-Bft)<0.54.$$

24. The zoom lens according to claim 23, wherein:

(a) the zoom lens has a lateral magnification $\beta 2W$ of the second lens group at the wide-angle end; and (b) the zoom lens satisfying the conditions:

$$-1<\beta 2W<-0.2.$$

25. The zoom lens according to claim 23, wherein:

(a) the first lens group has a focal length f1; and (b) the zoom lens satisfying the following condition:

$$0.8<f1/(fw \cdot ft)^{1/2}<1.4.$$

26. The zoom lens according to claim 23, wherein:

(a) the first lens group has a focal length f1, and the second lens group has a focal length f2; and (b) the zoom lens satisfying the following condition:

$$0.15<|f2|/f1<0.6.$$

27. A zoom lens forming an angle of an image of an object, substantially consisting of:

a first lens group having a positive refractive power and having a bi-convex shaped lens element cemented to a negative lens element;

a second lens group placed between the first lens group and the image;

a third lens group, placed between the second lens group and the image, having a positive refractive power;

a fourth lens group, placed between the third lens group and the image, having a negative refractive power; and an aperture stop placed between the second lens group and the third lens group;

wherein the zoom lens has no more than eight lens elements and includes an aspherical surface;

the zoom lens has a focal length fw at the wide-angle end, a focal length ft at the telephoto end, a back focus BfW at the wide-angle end, and a back focus Bft at the telephoto end; and the zoom lens satisfying the following condition:

$$0.3<(fw-Bfw)/(ft-Bft)<0.54.$$

* * * * *

UNITED STATES PATENT AND TRADEMARK OFFICE
CERTIFICATE OF CORRECTION

PATENT NO. : 6,031,669
DATED : February 29, 2000
INVENTOR(S) : Motoyuki Ohtake

It is certified that error appears in the above-identified patent and that said Letters Patent is hereby corrected as shown below:

Column 8,
Line 43, "7-15" should be -- 11-15 --.
Line 56, "lens. group G1" should be -- lens group G1 --.

Column 9,
Line 7, "lens-element surface of the zoom lens and the object." should be deleted.
Lines 39-40, "4A(VI), 4D(VI), 6A(VI), 6D(VI), 8A(VI), 8D(VI), 10A(VI), and 10D (VI)" should be -- 4A(IV), 4D(IV), 6A(IV), 6D(IV), 8A(IV), 8D(IV), 10A(IV), and 10D (IV) --.

Column 10,
Line 63, "$f_1/(f_W \cdot f_T)1/2 = 0.855$" should be -- $f_1/(f_W \cdot f_T)^{1/2} = 0.855$ --.

Column 11,
Line 4, "4A(I)" should be -- (4A(I) --.

Column 12,
Line 24, "$b_f$" should be -- $B_f$ --.
Line 44, "$f_1/f_W \cdot f_T)1/2 = 0.882$" should be -- $f_1/(f_W \cdot f_T)^{1/2} = 0.882$ --.

Column 13,
Line 53, "(Bf)" should be -- ($B_f$) --.

Column 14,
Line 33, "$(f_1/f_W \cdot f_T)1/2 = 1.021$" should be -- $f_1/(f_W \cdot f_T)^{1/2} = 1.021$ --.

Column 15,
Line 22-24, in Table 16,
"f = 38.8–75.3–121.8 mm
F/# = 4.1–6.5–9.1
2ω = 58.7–30.9–19.6°".
should be -- f = 38.8 - 75.3 - 121.8 mm
F/# = 4.1 - 6.5 - 9.1
2ω = 58.7 - 30.9 - 19.6° --.
Line 40, "(Bf)" should be -- ($B_f$) --.
Line 50, "C8 -  -4.52080 x $10^{-10}$" should be -- C8 = -4.52080 x $10^{-10}$ --.
Line 65, "$b_f$" should be -- $B_f$ --.

Column 16,
Line 18, "$f_1/f_W \cdot f_T)1/2 = 1.023$" should be -- $f_1/(f_W \cdot f_T)^{1/2} = 1.023$ --.

UNITED STATES PATENT AND TRADEMARK OFFICE
CERTIFICATE OF CORRECTION

PATENT NO. : 6,031,669
DATED : February 29, 2000
INVENTOR(S) : Motoyki Ohtake

It is certified that error appears in the above-identified patent and that said Letters Patent is hereby corrected as shown below:

Claims,
Column 17, claim 3,
Line 49, "$0.15|f_2| / f_1 < 0.6$" should be -- $0.15 < |f_2| / f_1 < 0.6$ --.

Column 18, claim 8,
Line 2, "obiectwise" should be -- objectwise --.

Column 18, claim 11,
Line 24, a colon -- : -- should be inserted after "wherein".

Column 18, claim 13,
Line 47, "p1" should be deleted, and "(a)" should begin a new paragraph.

Column 19, claim 15,
Line 24, "conditional" should be deleted.

Column 20, claim 23,
Line 10, "fw" should be -- $f_w$ --.
Line 11, "ft" should be -- $f_T$ --.
Line 12, "Bfw" and be -- $B_{fw}$ --.
Line 12, "Bft" should be -- $B_{fT}$ --.
Line 19, "$0.3 < (fw - Bfw)/(ft - Bft) < 0.54$" should be -- $0.3 < (f_w - B_{fw}/(f_T - B_{fT}) < 0.54$ --.

Column 20, claim 24,
Line 21, "β2W" should be -- $β_{2w}$ --.
Line 26, "$-1 < β\ 2W < -0.2$" should be -- $-1 < β_{2w} < -0.2$ --.

Column 20, claim 25,
Line 25, "f1" should be -- $f_1$ --.
Line 32, "$0.8 < f1/(fw \cdot ft)^{½} < 1.4$" should be -- $0.8 < f_1/(f_w \cdot f_T)^{½} < 1.4$ --.

Column 20, claim 26,
Line 34, "f1" should be -- $f_1$ --.
Line 35, "f2 should be -- $f_2$ --.
Line 39, "$0.15 < |f2|/f1 < 0.6$" should be -- $0.15 < |f_2|/f_1 < 0.6$ --.

UNITED STATES PATENT AND TRADEMARK OFFICE
CERTIFICATE OF CORRECTION

PATENT NO. : 6,031,669
DATED : February 29, 2000
INVENTOR(S) : Motoyki Ohtake

It is certified that error appears in the above-identified patent and that said Letters Patent is hereby corrected as shown below:

Column 20, claim 27,
Line 54, a colon -- : -- should be inserted after "wherein".
Line 57, "fw" should be -- $f_W$ --.
Line 58, "ft" should be -- $f_T$ --.
Line 58, "BfW" should be -- $B_{fW}$ --.
Line 59, "Bft" should be -- $B_{fT}$ --.
Line 63, "0.3 < (fw - Bfw)/(ft - Bft) < 0.54" should be -- $0.3 < (f_w - B_{fw})/(f_T - B_{fT}) < 0.54$ --.

Signed and Sealed this

Twenty-seventh Day of November, 2001

Attest:

NICHOLAS P. GODICI
Attesting Officer   Acting Director of the United States Patent and Trademark Office